US005812691A

United States Patent [19]
Udupa et al.

[11] Patent Number: 5,812,691
[45] Date of Patent: Sep. 22, 1998

[54] EXTRACTION OF FUZZY OBJECT INFORMATION IN MULTIDIMENSIONAL IMAGES FOR QUANTIFYING MS LESIONS OF THE BRAIN

[76] Inventors: Jayaram K. Udupa, 4024 Redwing La., Audubon, Pa. 19403; Supun Samarasekera, 3514 Lancaster Ave. #305, Philadelphia, Pa. 19104

[21] Appl. No.: 394,231

[22] Filed: Feb. 24, 1995

[51] Int. Cl.⁶ ........................................... G06K 9/46
[52] U.S. Cl. ..................... 382/128; 382/204; 128/653.1
[58] Field of Search ..................... 382/128, 131, 382/173, 180, 203, 204; 395/127, 131; 128/653.1

[56] References Cited

U.S. PATENT DOCUMENTS

| | | | |
|---|---|---|---|
| 4,545,384 | 10/1985 | Kawachi | 128/653 |
| 4,941,190 | 7/1990 | Joyce | 382/54 |
| 4,991,092 | 2/1991 | Greensite | 364/413.13 |
| 4,991,224 | 2/1991 | Takahashi et al. | 382/204 |
| 5,018,214 | 5/1991 | Pasch | 382/204 |
| 5,390,258 | 2/1995 | Levin | 382/155 |

OTHER PUBLICATIONS

Udupa and Herman, *3D Imaging in Medicine*, Boca Raton, FL: CRC Press, 1991.

Hohne, K. et al., *3D Imaging in Medicine, Algorithms, Systems, Applications*. Berlin: Springer–Verlag, 1990.

Kaufman, A., *A Tutorial on Volume Visualization*. Los Alamitos, CA: IEEE Computer Society Press, 1990.

Levoy, M., "Display of surfaces from volume data," *IEEE Computer Graphics and Applications*, vol. 8(3), pp. 29–37, May 1988.

Drebin, R. et al., "Volume rendering," *Computer Graphics*, vol. 22, pp. 65–74, 1988.

Vannier, M. et al., "Multispectral magnetic resonance image analysis," *CRC Critical reviews in Biomedical Engineering*, vol. 15, pp. 117–144, 1987.

Udupa, J. et al., "Surface and volume rendering in 3D imaging: a comparison," *Journal of Digital Imaging*, vol. 4, pp. 159–168, 1991.

Udupa and Odhner, "Shell rendering," *IEEE Computer Graphics and Applications*, vol. 13, No. 6, pp. 58–67, 1993.

Rosenfeld, A., "Fuzzy digital topology," *Information and Control*, vol. 40, No. 1, pp. 76–87, 1979.

Rosenfeld, A., The fuzzy geometry of image subsets, *Pattern Recognition Letters*, vol. 2, No. 5, pp. 311–317, Sep., 1984.

Reder and Arnason, *Immunology of Multiple Sclerosis*. In: Vinken, P.J. et al., Handbook of Clinical Neurology, vol. 3 (47): Demyelinating Diseases. Amsterdam: Elsevier Science, pp. 337–395, 1985.

Young, I. et al., "Nuclear magnetic resonance imaging of the brain in multiple sclerosis," *Lancet*, vol. 2, pp. 1063–1066, 1981.

Willoughby, E. et al., "Serial magnetic resonance scanning in multiple sclerosis: A second prospective study in relapsing patients," *Ann. Neurol.*, col. 14, pp. 43–49, 1989.

Wolff and Balaban, "Magnetization transfer contrast (MTC) and tissue water proton relaxation in vivo," *Magn. Reson. Med.*, vol. 10, pp. 135–144, 1989.

(List continued on next page.)

*Primary Examiner*—Christopher Kelley
*Attorney, Agent, or Firm*—Woodcock Washburn Kurtz Mackiewicz & Norris LLP

[57] ABSTRACT

A technique for object information extraction from images which retains fuzziness as realistically as possible. The technique is used for image segmentation of fuzzy objects for n-dimensional digital spaces based on the notion of "hanging togetherness" of image elements specified by their fuzzy connectedness. A specified fuzzy object is extracted and all fuzzy objects present in the image data are identified by segmenting the image using the notion of "hanging togetherness" of image elements specified by their fuzzy connectedness as defined herein. The technique is used in a preferred embodiment to quantify MS lesions of the brain via magnetic resonance imaging.

18 Claims, 7 Drawing Sheets

OTHER PUBLICATIONS

Dousset, V. et al., "Experimental allergic encephalomyelitis and multiple sclerosis: Lesion characterization with magnetization transfer imaging," *Radiology*, vol. 182, No. 2, pp. 483–491, 1992.

Outwater, E. et al., "Magnetization transfer of hepatic lesions: Evaluation of a novel contrast technique in the abdomen," *Radiology*, vol. 182, pp. 535–540, 1992

McGowan, J. et al., "Magnetization transfer imaging with pulsed off–resonance saturation: Contrast variation with saturation duty cycle," *J. Mag. Res.*, vol. 4, No. 1, pp. 79–82, 1994.

Kapouleas, I., "Automatic detection of white matter lesions in magnetic resonance brain images," *Computer Programs and Methods in Biomedicine*, vol. 1, pp. 17–35, 1990.

Raya, S., "Low–level segmentation of 3–D magnetic brain images–a rule–based system," *IEEE Transactions on Medical Imaging*, vol. 9, No. 3, pp. 327–337, 1990.

Kohn, M. et al., "Analysis of brain and cerebrospinal fluid volumes with MR imaging. Part I. Methods, reliability and validation," *Radiology*, vol. 178, pp. 115–122, 1991.

Kamber, M. et al., "Model–based 3–D segmentation of multiple sclerosis lesions in dual–echo MRI data," *Proceedings of VBC'92*, pp. 590–600, 1992.

Bezdek, J. et al., "Review of MR image segmentation techniques using pattern recognition," *Medical Physics*, vol. 20, No. 4, pp. 1033–1048, 1993.

Soltanian–Zadeh, H. et al., "A comparative analysis of several transformations for enhancement and segmentation of magnetic resonance image scene sequences," *IEEE Transactions of Medical Imaging*, vol. 11, No. 3, pp. 302–318, 1992.

Cline, H. et al., "Three–dimensional segmentation of MR images of the head using probability and connectivity," *JCAT*, vol. 14, No. 6, pp. 1037–1045, 1990.

Kaufmann, A., *Introduction to the Theory of Fuzzy Subsets*, vol. I. New York, NY: Academic Press, Inc., 1975.

Kong and Rosenfeld, "Digital topology: Introduction and survey," *Computer Vision, Graphics, and Image Processing*, vol. 48, pp. 357–393, 1989.

Herman, G., "Discrete multidimesional Jordan surfaces," *CVGIP: Graphic Models and Image Processing*, vol. 54, pp. 507–515, 1992.

Udupa, J.K., "Multidimensional digital boundaries," *CVGIP: Graphical Models and Image Processing*, vol. 50, No. 4, pp. 311–323, 1994.

Udupa and Ajjanagadde, "Boundary and object labelling in three–dimesional images," *Computer Vision, Graphics, and Image Processing*, vol. 51, pp. 355–369, 1990.

Napel, S. et al., "Visualizing three–dimensional flow with simulated streamlines and three–dimensional phase–contrast MR imaging," *Journal of Magnetic Resonance Imaging*, vol. 2, pp. 143–153, 1992.

Udupa, J. et al., "3DVIEWNIX: An open, transportable, multidimensional, multimodality, multiparametric imaging software system," in *SPIE Proceedings*, vol. 2164, pp. 58–73, 1994.

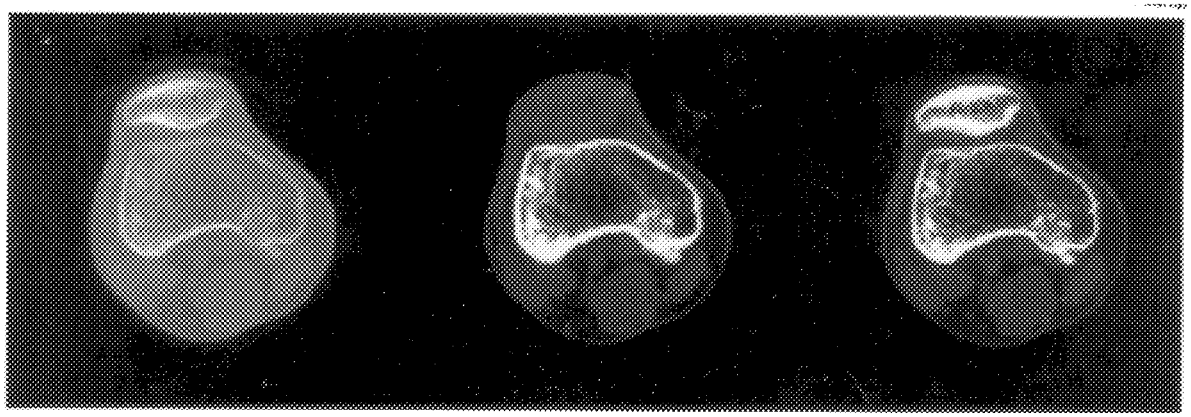
FIG. 1-A  FIG. 1-B  FIG. 1-C
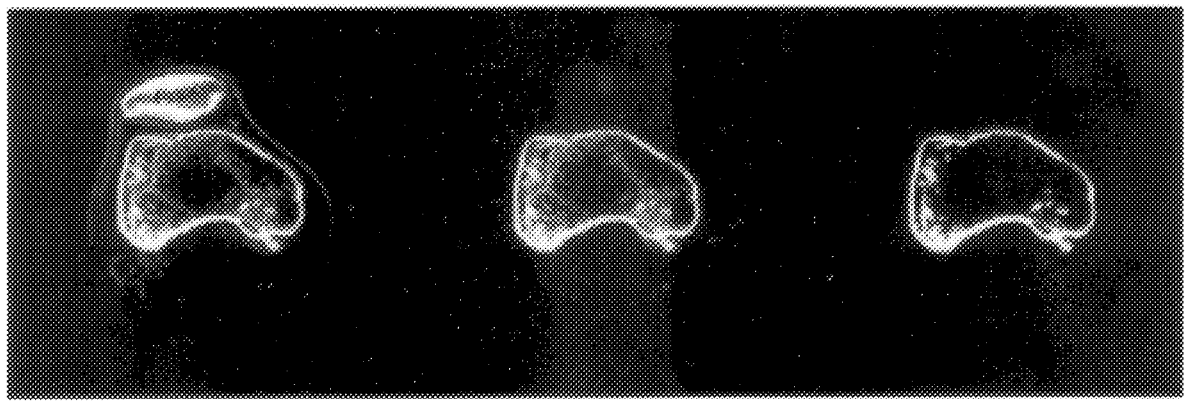
FIG. 1-D  FIG. 1-E  FIG. 1-F
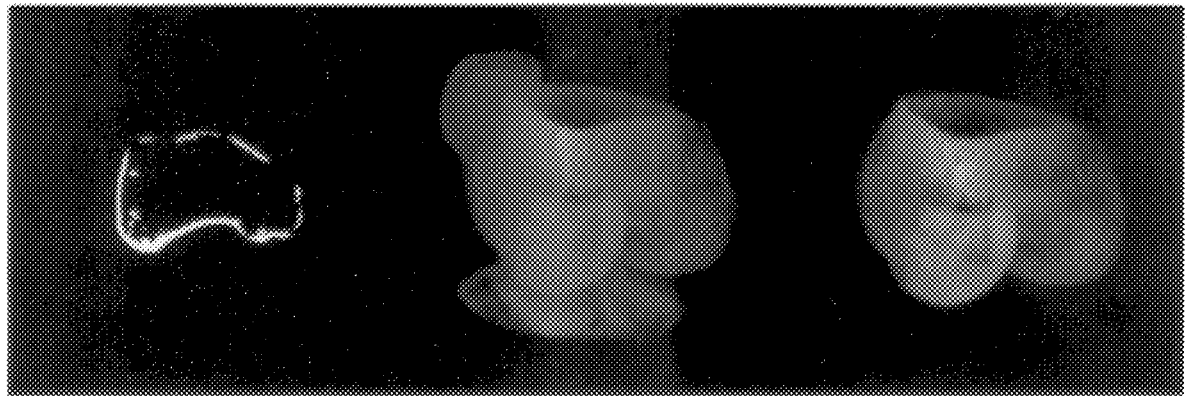
FIG. 1-G  FIG. 1-H  FIG. 1-I

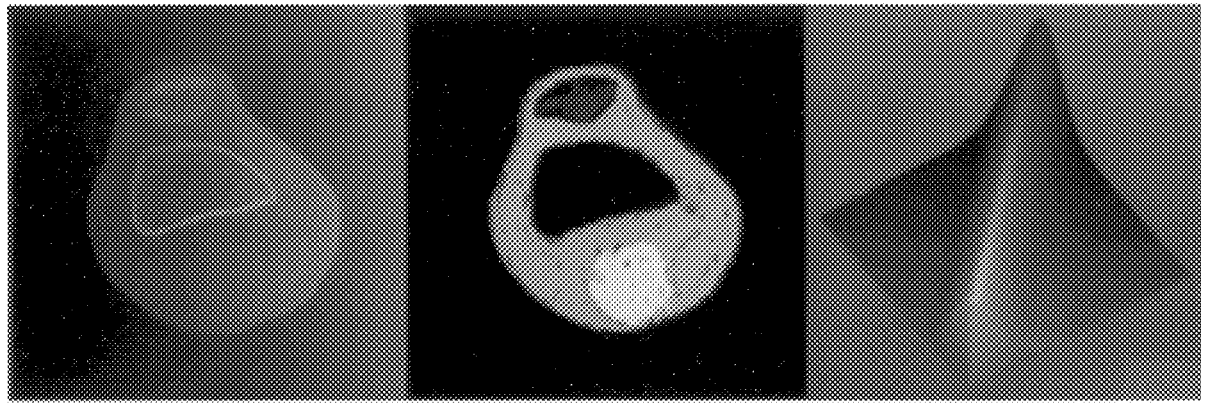
FIG. 2-A    FIG. 2-B    FIG. 2-C
FIG. 2-D    FIG. 2-E

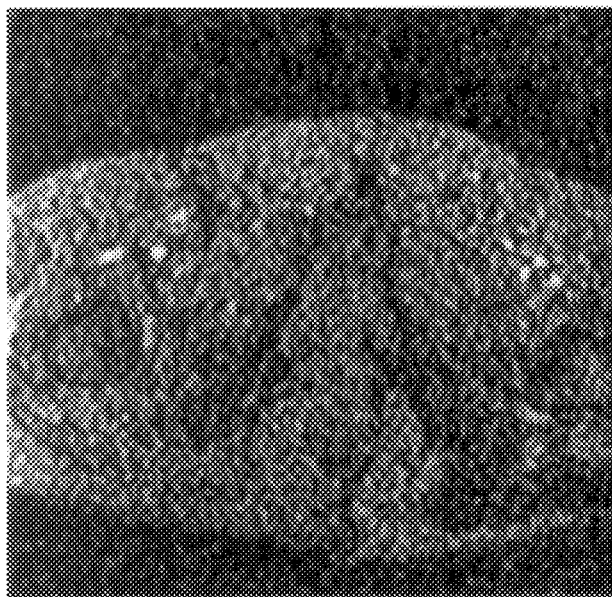
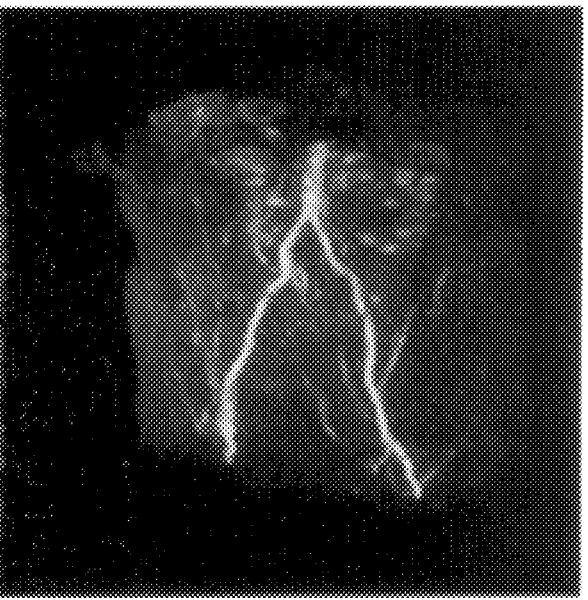
FIG. 3-A  FIG. 3-B
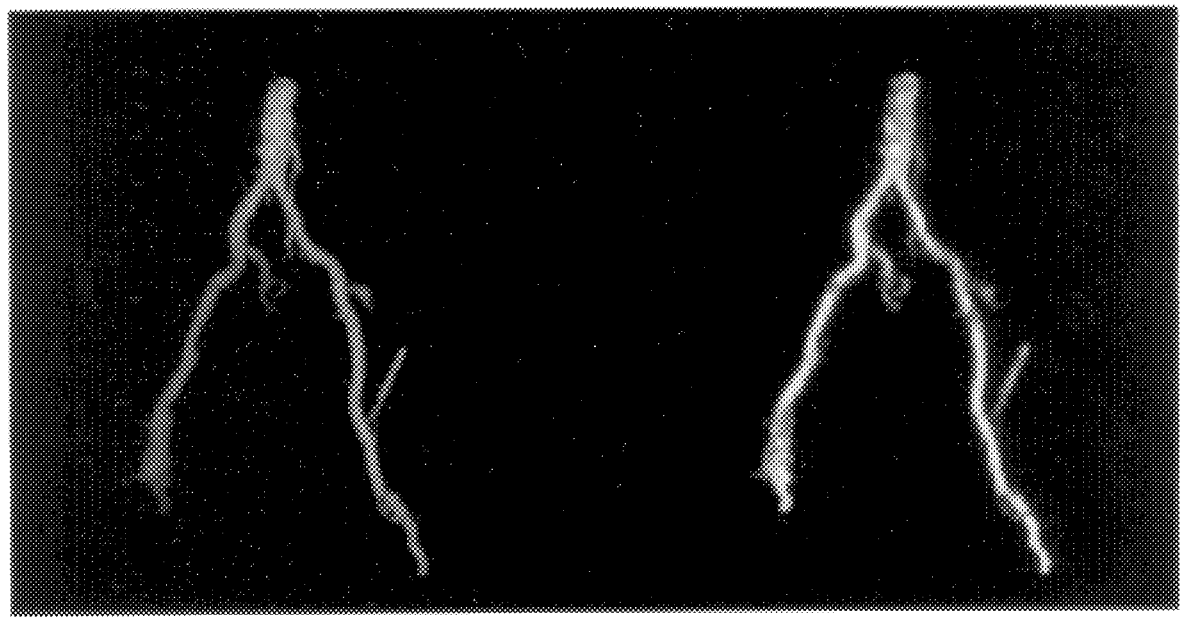
FIG. 3-C  FIG. 3-D

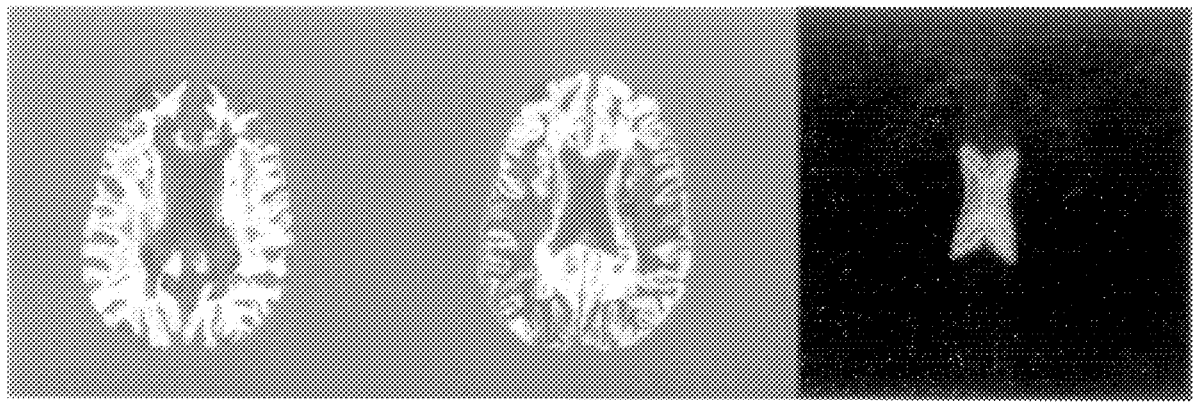
FIG. 4-A  FIG. 4-B  FIG. 4-C
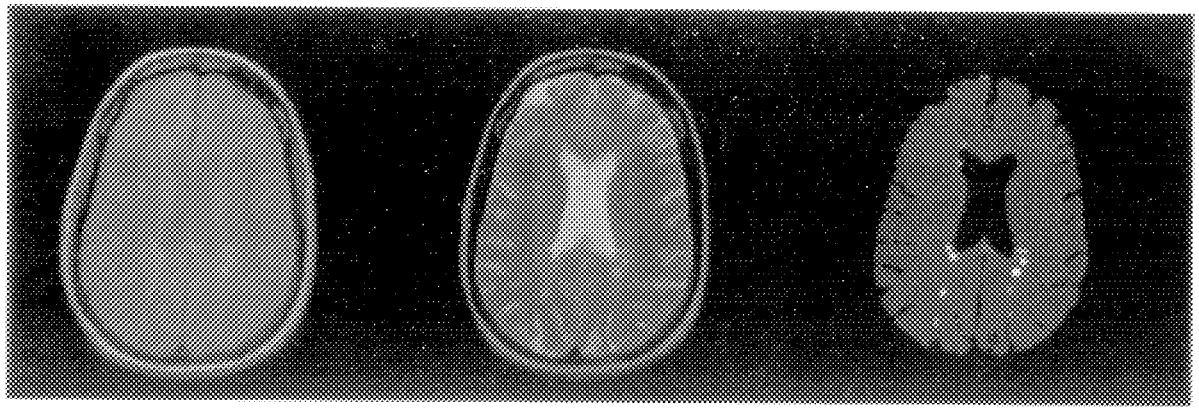
FIG. 4-D  FIG. 4-E  FIG. 4-F

EXTRACTION OF FUZZY OBJECT INFORMATION IN MULTIDIMENSIONAL IMAGES FOR QUANTIFYING MS LESIONS OF THE BRAIN

STATEMENT OF OWNERSHIP INTEREST

Development of the subject matter of the present application was supported by monies obtained under NIH Grant CA56071. The U.S. Government may have certain rights in this invention.

BACKGROUND OF THE INVENTION

1. Field of the Invention

The present invention relates to a technique for extracting a specified fuzzy object and for identifying all fuzzy objects present in image data by segmenting the image using the notion of "hanging togetherness" of image elements specified by their fuzzy connectedness, and more particularly, to a technique for quantifying MS lesions of the brain via magnetic resonance imaging.

2. Description of the Prior Art

Image data captured by imaging devices such as biomedical scanners have inherent inaccuracies. The degree of this inaccuracy depends on a number of factors including limitations in spatial, temporal, and parametric resolutions and other physical limitations of the imaging device. The main 3D imaging operations of visualization, manipulation, and analysis are usually aimed toward certain "objects" which are represented in the image data as characteristic intensity patterns. When the object of interest has intensity patterns distinctly different from those of other objects, it is often possible to segment the object in a hard sense into a binary image. Although such a strategy does not account for most of the inaccuracies in acquired data, significant progress has been made over the past 15 years in effectively visualizing, manipulating, and analyzing multidimensional, multimodality object information. Indeed, many otherwise impracticable applications have evolved, such as those described by Udupa et al. in 3D Imaging in Medicine, Boca Raton, Fla.: CRC Press, 1991; Hohne et al. in 3D Imaging in Medicine, Algorithms, Systems, Applications, Berlin: Springer-Verlag, 1990; and Kaufman in A Tutorial on Volume Visualization, Los Alamitos, Calif.: IEEE Computer Society Press, 1990.

Attempts to retain data inaccuracies and pass them on to the human observer have been made in the context of volume rendering developments in visualization. For example, such techniques are described by Levoy in "Display of Surfaces from Volume Data," IEEE Computer Graphics and Applications, Vol. 8(3), May, 1988, pp. 29–37, and by Drebin et al. in "Volume Rendering," Computer Graphics, Vol. 22, 1988, pp. 65–74. Although philosophically this was a departure from the principle of hard structure definition, just a provision to retain inaccuracies by itself does not guarantee the accuracy of their retention. From this consideration, the relative accuracy of these strategies compared to those using hard (binary) segmentation principles naturally becomes an important issue. This subject has been studied to some extent in some specific application situations, as evidenced by the research documented by Vannier et al. in "Multispectral Magnetic Resonance Image Analysis," CRC Critical Reviews in Biomedical Engineering, Vol. 15, pp. 117–144, 1987, and by Udupa et al. in "Surface and Volume Rendering in 3D Imaging: a Comparison," Journal of Digital Imaging, Vol. 4, 1991, pp. 159–168, but it remains largely unexplored in medical 3D Imaging.

The principle of retention of data inaccuracies as accurately as possible in object representations and subsequently in object renditions and analysis is currently preferred, but, this has not been explored in medical 3D imaging except in the context of volume rendering. Even there, no formal framework has yet been developed to handle object-related issues. Traditionally, in volume rendering, the given image data are considered to represent an amorphous volume, the emphasis being mainly on creating a rendition that depicts object structures represented in the image data. By bringing explicitly the notion of a structure, it has been shown by Udupa et al. in "Shell Rendering," IEEE Computer Graphics and Applications, Vol. 13, No. 6, 1993, pp. 58–67, that volume rendering operations become significantly more efficient computationally. The present inventors now extend this concept to the notion that an "object" should be defined formally in the fuzzy setting in order to take operations that can handle data inaccuracies beyond mere visualization to object segmentation, manipulation, and analysis.

The basic mathematical framework toward this goal is found by addressing issues of the following form: How are objects to be defined in a fuzzy setting? How are topological concepts such as connectivity and boundary to be handled in fuzzy situations? What are the algorithms to efficiently extract fuzzy connected components and fuzzy boundaries? Although the theory of fuzzy subsets is an appropriate mathematical vehicle for addressing these issues, there is little published literature on dealing with fuzzy topological notions, the only exceptions being the article by Rosenfeld entitled "Fuzzy Digital Topology," Information and Control, Vol. 40, No. 1, 1979, pp. 76–87, and the article by Rosenfeld et al. entitled "The Fuzzy Geometry of Image Subsets," Pattern Recognition Letters, Vol. 2, No. 5, pp. 311–317 (1984), that deal with some of these notions for 2D digital pictures.

The fuzzy connectivity and object notions have significant implications in image segmentation. The main hardships encountered in the design of effective segmentation algorithms are attributable to the inflexibility of the rigid, often contradicting, requirements that attempt to distinguish between object and non-object regions. The flexibility afforded by fuzzy connectivity substantially eases these requirements making "fuzzy connected component" a computable alternative to the notion of an "object." As will be described herein, the present inventors have found that "fuzzy connectedness" is a concept that effectively captures fuzzy "hanging togetherness" of image elements—a notion that has been missing in past segmentation research. Indeed, the present inventors will demonstrate herein that finding fuzzy connected components is often a powerful solution to the difficult segmentation problem. To elucidate this point further, the invention is described in conjunction with the problem of finding and quantifying multiple sclerosis lesions of the brain.

Multiple sclerosis (MS) is a crippling neurological disease, mainly of the brain. Various MR imaging protocols have been developed during the past several years for detecting the onset of the disease and for following up its progression longitudinally. For example, MR imaging protocols for MS are described by Young et al. in "Nuclear Magnetic Resonance Imaging of the Brain In Multiple Sclerosis," Lancet, Vol. 2, 1981, pp. 1063–1066 and by Willoughby et al. in "Serial Magnetic Resonance Scanning in Multiple Sclerosis: A Second Prospective Study in Relapsing Patients," Ann. Neurol., Vol. 25, 1989, pp. 43–49. The disease manifests itself as small blobs or patches in MR cross-sectional images. The actual intensity pattern within the blobs depends on the MR imaging protocol. Some protocols show the lesions as bright patches, others show them as dull gray patches. The design of MR imaging protocols that can make the lesions appear enhanced and therefore more conspicuous is a very active area of investigation in neuroradiology at present. Current research is described by Wolff et al. in "Magnetization Transfer Contrast (MTC) and Tissue Water Proton Relaxation in Vivo," *Magn. Reson. Med.*, Vol. 10, 1989, pp. 135–144; Dousset et al. in "Experimental Allergic Encephalomyelitis and Multiple Sclerosis: Lesion Characterization with Magnetization Transfer Imaging," *Radiology*, Vol. 182, No. 2, 1992, pp. 483–491 [erratum in *Radiology*, Vol. 183, No. 3, 1992, p. 878]; Outwater et al. in "Magnetization Transfer of Hepatic Lesions: Evaluation of a Novel Contrast Technique in the Abdomen," *Radiology*, Vol. 182, 1992, p. 535–540; and McGowan et al. in "Magnetization Transfer Imaging with Pulsed Off-resonance Saturation: Contrast Variation with Saturation Duty Cycle," *J. Magn. Res.*, Vol. 4, No. 1, 1994, pp. 79–82.

To objectively determine the extent of the disease, its progression/regression with time, and more importantly, to assess the effect of drugs that are currently being developed for treating the disease, it becomes essential to quantify the extent and the number of sites of the lesions. At present, mostly manual techniques are used wherein an operator, such as a neuroradiologist, identifies the lesion sites and draws its boundary using a cursor on a workstation screen for each slice displayed on the screen. This method is unacceptable for two reasons. First, since the lesions are inherently fuzzy, inter- and intra-operator repeatability of lesion boundary delineation becomes highly suspect. Manual outlining of small fuzzy blobs is an ill-defined task. Second, since the lesions are often numerous, manual identification and delineation becomes very labor intensive. Computer assisted techniques of lesion quantification therefore have become inevitable in MS research.

Computer algorithms for identifying tissue regions in MR brain images have been developed recently. For example, such algorithms are described by Kapouleas in "Automatic Detection of White Matter Lesions in Magnetic Resonance Brain Images," *Computer Programs and Methods in Biomedicine*, Vol. 1, 1990, pp. 17–35; Raya in "Low-level Segmentation of 3-D Magnetic Brain Images—a Rule-Based System," *IEEE Transactions on Medical Imaging*, Vol. 9, No. 3, 1990, pp. 327–337; Kohn et al. in "Analysis of Brain and Cerebrospinal Fluid Volumes with MR Imaging. Part I. Methods, Reliability and Validation," *Radiology*, Vol. 178, 1991, pp. 115–122; Kamber et al. in "Model-based 3D Segmentation of Multiple Sclerosis Lesions in Dual-echo MRI Data," *Proceedings of VBC '92*, 1992, pp. 590–600; Bezdek et al. in "Review of MR Image Segmentation Techniques Using Pattern Recognition," *Medical Physics*, Vol. 20, No. 4, 1993, pp. 1033–1048; Soltanian-Zadeh et al. in "A Comparative Analysis of Several Transformations for Enhancement and Segmentation of Magnetic Resonance Images," *IEEE Transactions of Medical Imaging*, Vol. 11, No. 3, 1992, pp. 302–318; and Cline et al. in "Three-dimensional Segmentation of MR Images of the Head Using Probability and Connectivity," *JCAT*, Vol. 14, No. 6, 1990, pp. 1037–1045. Most of these algorithms determine the extent of the tissue regions in a binary fashion. That is, image elements are classified as either being in the tissue region or as not being in it. This strategy becomes very inadequate in dealing with small, inherently fuzzy structures such as MS lesions, or, for that matter, even larger structures such as white and gray matter. Imposing decisions as to which image elements are in the structure and which are not when the structure has a range of gradations of the "strengths" of its component parts is an arbitrary, inaccurate and incomplete way of dealing with object information.

To illustrate this point, FIG. 1a illustrates the CT slice image of a patient's knee. It is assumed that one is interested in identifying the bony region in the slice corresponding to only the biggest bone in the slice. Simpler methods such as intensity thresholding will simply fail to identify simultaneously the dense as well as the cancellous parts of the bone. The more sophisticated methods will perhaps identify both parts but will do so for the other bone regions as well and perhaps they will mis-identify some of the soft-tissue regions also as being part of the bone, as shown in FIG. 1c and 1d. The desired result is illustrated in FIG. 1e. The reasons for failure of the existing methods in this example and in numerous other situations, such as MS lesions, are (i) the lack of an appropriate theory that captures the idea of image elements "hanging together" to form a fuzzy object, and (ii) the lack of algorithms that can efficiently extract image elements that "hang together". The notions of fuzzy objects and their fuzzy connectedness and the associated algorithms in accordance with the invention constitute the first known solutions to these problems. The object shown in FIG. 1e is in fact the result produced by the techniques of the invention.

The second related issue for which a solution does not exist currently is the estimation of volume of fuzzy objects realistically from acquired image data. In the context of the example of FIG. 1a, this problem relates to the task of describing the area occupied by the bone under consideration in the 2D image. The existing methods for volume/area computation have two drawbacks. First, since object definition is a prerequisite for volume computation and no method exists for extracting fuzzy connected objects, it is not possible to estimate the volume of fuzzy (connected) objects at present. Second, even if it were possible to extract a fuzzy object from images, the current methods cannot adequately describe the object composition in their volume measures. The reason for this is that they all produce a single number as the descriptor of the volume of the object. Obviously, objects that differ vastly in their composition may all have identical or very similar volume in this sense of the measure. For the example in FIG. 1a, this means that within the same "area" vastly differing compositions of dense and cancellous bone can be arranged. In the context of MS lesions, this implies that existing methods may produce the same volume, for example, for lesions that are strong and uniform and for those that are mostly weak and faint but have a small strong core.

Accordingly, a technique is desired which effectively addresses both of these issues to permit extraction of a specified fuzzy object and identification of all fuzzy objects present in image data. The present invention has been designed to meet these needs in the art.

SUMMARY OF THE INVENTION

A technique which addresses the above-mentioned needs in the art is described herein. In accordance with the invention, the first issue noted above is handled through the notion of fuzzy connected objects, while the second issue noted above is handled by associating a volume distribution with the fuzzy object. This distribution is obtained by ascribing to each of a discrete set of object "strengths" a number representing the volume of the object of that strength.

In particular, the present invention relates to an imaging system for identifying fuzzy or blurred objects within a multidimensional scene and extracting and/or labelling such fuzzy objects. In accordance with a preferred embodiment, means such as an MR scanner are provided for creating a digital representation of the multidimensional scene and storing the digital representation in a memory as a plurality of spatial elements. Processing means are provided for determining the strength of connectedness or "hanging togetherness" of each spatial element in the digital representation of the scene with other spatial elements in the digital representation of the scene. Those spatial elements having strengths of connectedness with other spatial elements above a predetermined threshold are then clustered into a fuzzy connected component of a fuzzy object in the scene, and the fuzzy connected component is displayed so that it is distinguished from other fuzzy connected components in the scene. In this manner, the fuzzy connected component is identified.

The volume distribution of the fuzzy connected component may also be calculated by the processing means for different settings of the predetermined threshold. In other words, the volume distribution is different for different thresholds. Preferably, the strength of connectedness of spatial elements in the digital representation of the scene has any of a number of values so that the determination of the strength of connectedness along paths between spatial elements is truly dynamic. The invention preferably identifies fuzzy objects in three dimensions by creating digital representations of the scene as a set of image slices which are processed in accordance with the techniques of the invention.

The invention also comprises a method of identifying fuzzy or blurred objects within a multidimensional scene. A preferred embodiment of such a method preferably comprises the steps of:

scanning the scene to create a digital representation of the scene which is stored as a plurality of spatial elements;

determining a strength of connectedness of each spatial element in the digital representation of the scene with other spatial elements in the digital representation of the scene;

creating a $K_o$ scene comprising spatial elements having strengths of connectedness with other spatial elements above a predetermined threshold; and displaying the $K_o$ scene.

Preferably, the method of the invention also comprises the step of determining a volume distribution of a fuzzy connected object comprising spatial elements with strengths of connectedness with other spatial elements above the predetermined threshold. By setting the threshold at different values, different volume distributions may be obtained.

In a preferred implementation of the fuzzy object extraction and labelling technique of the invention, techniques are provided for detecting multiple sclerosis (MS) lesions in a magnetic resonance (MR) image of a patient's brain. Such a system in accordance with the invention comprises an MR scanner for creating a digital representation of an image slice through the patient's brain for storage in a memory as a plurality of spatial elements. Processing means are provided for determining a strength of connectedness of each spatial element in the digital representation of the image slice with other spatial elements in the digital representation of the image slice, and for clustering those spatial elements having strengths of connectedness with other spatial elements above a predetermined threshold into a fuzzy connected component of the portion of the patient's brain in the image slice. The clustered spatial elements are then displayed to permit identification of the fuzzy connected component as an MS lesion in the image slice of the patient's brain. The volume distribution of the MS lesion is also determined for the preselected threshold, thereby allowing better quantification of the volume of the MS lesion. The three dimensional volume distribution of the MS lesion is readily determined by creating a set of image slices and determining a strength of connectedness of each spatial element in a digital representation of one image slice with other spatial elements in a digital representation of another image slice.

Finally, a method of detecting multiple sclerosis (MS) lesions in a magnetic resonance (MR) image of a patient's brain is described herein comprising the steps of:

creating a digital representation of an MR image slice through the patient's brain and storing the digital representation as a plurality of spatial elements;

specifying spatial elements in at least one of the gray matter, white matter, and ventricles of the MR image slice through the patient's brain as starting points for a strength of connectedness determination for the spatial elements;

determining a strength of connectedness of each spatial element in the digital representation of the MR image slice, starting with the starting points, with other spatial elements in the digital representation of the MR image slice;

clustering spatial elements having strengths of connectedness with other spatial elements above predetermined thresholds into fuzzy connected white matter, gray matter, ventricle, and lesion components of the portion of the patient's brain in the image slice; and identifying the fuzzy connected lesion component as an MS lesion by displaying the fuzzy connected lesion component so that it is distinguished from the fuzzy connected white matter, gray matter, and ventricle components in the image slice of the patient's brain.

Preferably, the clustering step comprises the steps of dividing the digital representation of the MR image slice in a scatter plot into segments, computing the center of mass and principal axes of one of the segments, and determining from the principal axes and the center of mass of the segment a cluster representing white matter and a cluster representing gray matter of the patient's brain. A cluster representing cerebrospinal fluid of the patient's brain is also determined by computing the center of mass of another one of the segments predicted to include the cerebrospinal fluid and determining which fuzzy connected component contains the center of mass of that segment. In addition, multidimensional volume distributions of the MS lesion are determined from a set of image slices by determining the strength of connectedness of each spatial element in a digital representation of one image slice with other spatial elements in a digital representation of another image slice.

BRIEF DESCRIPTION OF THE DRAWINGS

The above-mentioned and other objects and advantages of the invention will become more apparent to those skilled in the art from the following detailed description of the invention with reference to the attached drawings, of which:

FIG. 1a illustrates a $c_1c_2$ slice of a 3D CT image of a patient's knee.

FIG. 1b illustrates a $K_o$ scene for the 2D image in FIG. 1a, where the spel o was specified in the dense part of the bone.

FIG. 1c illustrates a fuzzy $\kappa\theta_x$ object of the 2D image in FIG. 1a containing o for a "very low" value of x.

FIG. 1d illustrates a fuzzy $\kappa\theta_x$ object of the 2D image in FIG. 1a containing o for a "low" value of x.

FIG. 1e illustrates a fuzzy $\kappa\theta_x$ object of the 2D image in FIG. 1a containing o for a "medium" value of x.

FIG. 1f illustrates a fuzzy $\kappa\theta_x$ object of the 2D image in FIG. 1a containing o for a "high" value of x.

FIG. 1g illustrates a fuzzy $\kappa\theta_x$ object of the 2D image in FIG. 1a containing o for a "very high" value of x.

FIG. 1h illustrates a shell rendition of the bones in the 2D image in FIG. 1a using a trapezoidal opacity function.

FIG. 1i illustrates a shell rendition of the fuzzy $\kappa\theta_x$ object shown in FIG. 1e.

FIG. 2a illustrates the $c_1c_2$ slice of FIG. 1a with an added ramp going from left to right.

FIG. 2b illustrates the $K_o$ scene for the 2D image in FIG. 1a for a spel o specified in the soft-tissue blob in the lower center of the image.

FIG. 2c illustrates a fuzzy $\kappa\theta_x$ object of the 2D image in FIG. 1a containing o for a "high" value of x.

FIG. 2d illustrates a fuzzy $\kappa\theta_x$ object of the 2D image in FIG. 1a containing o for a "medium" value of x.

FIG. 2e illustrates the functional form of $\mu_\kappa(c,d)$ used to detect the $\kappa\theta_x$ objects.

FIG. 3a illustrates a $c_1c_2$ slice of a 3D MR angiographic scene, where the bright spots correspond to flow in vessels.

FIG. 3b illustrates a maximum intensity projection (MIP) of the image in FIG. 3a.

FIG. 3c illustrates a shell rendition of a $\kappa\theta_x$ object of the image in FIG. 3a detected for a "medium" value of x.

FIG. 3d illustrates a MIP rendition of the $\kappa\theta_x$ object of the image in FIG. 3c.

FIG. 4a illustrates a $c_1c_2$ slice of the $K_o$ scene of the image in FIGS. 4d and 4e for the white matter.

FIG. 4b illustrates a $c_1c_2$ slice of the $K_o$ scene of the image in FIGS. 4d and 4e for the gray matter.

FIG. 4c illustrates a $c_1c_2$ slice of the $K_o$ scene of the image in FIGS. 4d and 4e for the ventricles.

FIG. 4d illustrates a $c_1c_2$ slice of the T2 values of a vector valued 3D MR image.

FIG. 4e illustrates a $c_1c_2$ slice of the proton density values of a vector valued 3D MR image.

FIG. 4f illustrates a $c_1c_2$ slice of the $K_o$ scene of the image in FIGS. 4d and 4e for the lesions.

DETAILED DESCRIPTION OF THE PRESENTLY PREFERRED EMBODIMENTS

Figure 5:
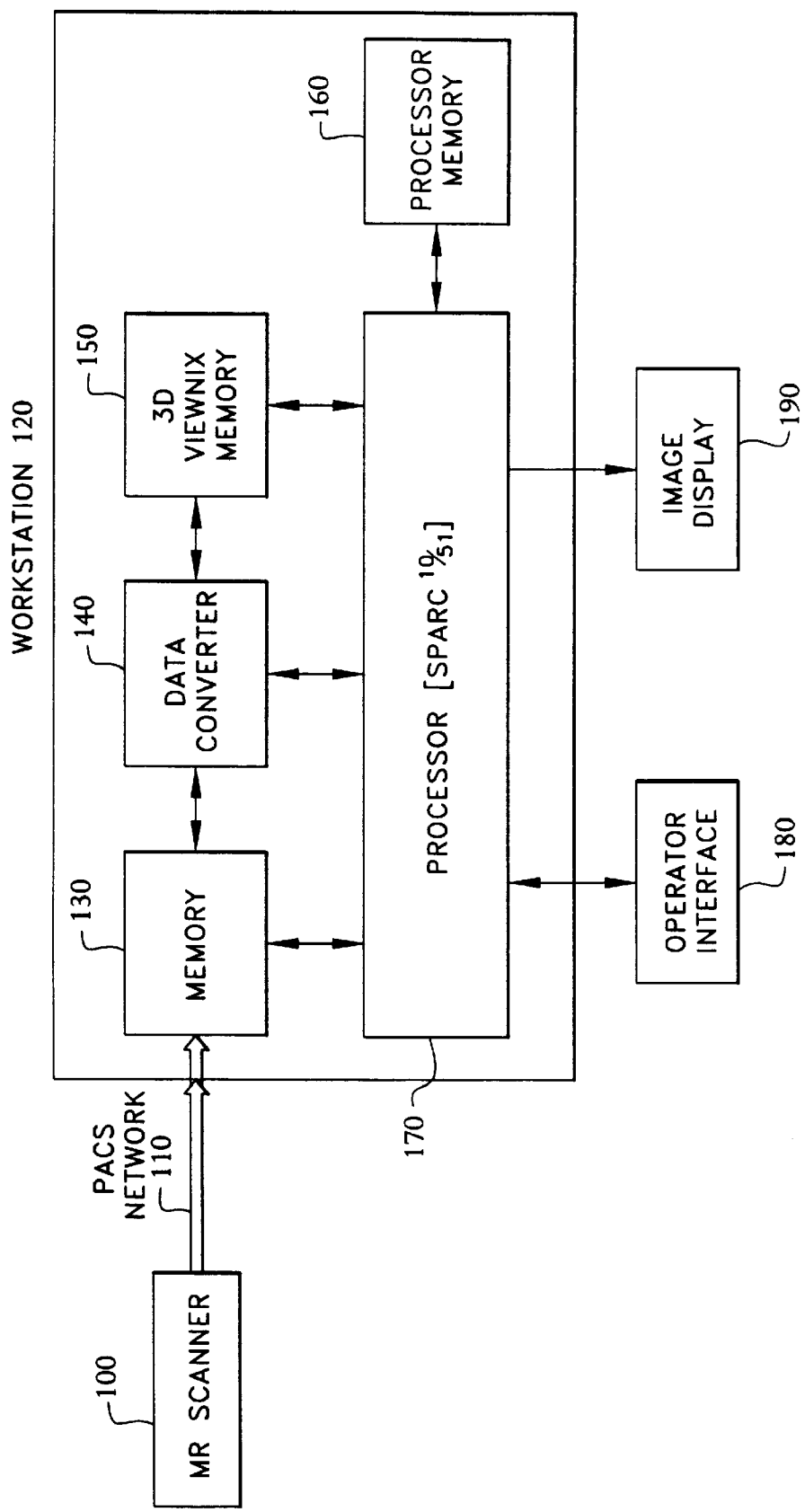
FIG. 5 illustrates a preferred embodiment of a system for the detection and quantification of MS lesions in accordance with the techniques of the invention.

A technique which meets the above-mentioned objects and provides other beneficial features in accordance with the presently preferred exemplary embodiments of the invention will be described below with reference to FIGS. 1–7. Those skilled in the art will readily appreciate that the description given herein with respect to those figures is for explanatory purposes only and is not intended in any way to limit the scope of the invention. All questions regarding the scope of the invention should be resolved by referring to the appended claims.

In order to understand the technique of the invention, a theory of fuzzy objects and of their connectivity is first developed in Section I for digital spaces of finite dimensionality. Efficient algorithms for extracting fuzzy connected components from membership images are then described in Section II. The utility of these algorithms in image segmentation based on examples drawn from several clinical and medical imaging areas are then described in Section III. Finally, the technique of the invention is described for the detection of MS lesions of the brain in Section IV.

I. Theory

Some known definitions from the theory of fuzzy subsets as described by Kaufmann in *Introduction to the Theory of Fuzzy Subsets*, Vol. 1, New York, N.Y.: Academic Press, 1975, are set forth below.

A. Fuzzy Subsets, Membership Function, Fuzzy Relation

If X is any reference set, then a fuzzy subset A of X is a set of ordered pairs $$A=\{(x,\mu_A(x))|x\in X\} \qquad \text{Equation 1}$$

where $$\mu_A: X \to [0, 1] \qquad \text{Equation 2}$$

is the membership function of A in X. A is nonempty if there exists $x \in X$ such that $\mu_A(x) \neq 0$. The empty fuzzy subset of X, denoted $\Phi$, satisfies $\mu_\Phi(x)=0$ for all $x \in X$. $\Phi$ will be used to denote the empty fuzzy subset of any reference set and $\phi$ to denote the empty hard set. The fuzzy union and intersection operations between fuzzy subsets A and B of X are defined as follows: $A \cup B=\{(x,\mu_{A \cup B}(x)|x \in X\}$, where, for all $x \in X$, $\mu_{A \cup B}(x)=\max[\mu_A(x), \mu_B(x)]$; $A \cap B=\{(x, \mu_{A \cap B}(x))|x \in X\}$, where, for all $x \in X$, $\mu_{A \cap B}(x)=\min[\mu_A(x),\mu_B(x)]$.

A fuzzy relation $\rho$ in X is a fuzzy subset of X×X:

$$\rho=\{((x,y), \mu_\rho(x, y))|(x,y)\in X\times X\} \qquad \text{Equation 3}$$

where $$\mu_\rho: X\times X \to [0, 1]. \qquad \text{Equation 4}$$

Strictly speaking, Equations 3 and 4 define a fuzzy 2-ary relation. Since fuzzy m-ary relations for m>2 are not of interest, the qualifier "2-ary" will be dropped for simplicity. $\mu$ will always be used subscripted by the fuzzy subset under consideration to denote the membership function of the fuzzy subset. For hard subsets, $\mu$ will denote their characteristic function. The following properties of $\rho$ are of interest:

Reflexivity: for all $(x,x)\in X\times X$, $\mu_\rho(x,x)=1$.     Equation 5

Symmetry: for all $(x,y)\in X\times X$, $\mu_\rho(x,y)=\mu_\rho(y,x)$.     Equation 6

Transitivity: for all $(x,y)$, $(y,z)$, $(x,z)\in X\times X$, $\mu_\rho(x,z)=\max_y[\min(\mu_\rho(x,y),\mu_\rho(y,z))]$.     Equation 7

$\rho$ is called a similitude relation in X if it is reflexive, symmetric, and transitive.

B. $R^n$, $Z^n$, Spels, Fuzzy Spel Adjacency, Fuzzy Digital Space

Let n-dimensional Euclidean space $R^n$ be subdivided into hypercuboids by n mutually orthogonal families of parallel hyperplanes. It is assumed, with no loss of generality, that the hyperplanes in each family have equal unit spacing so that the hypercuboids are unit hypercubes. Coordinates are chosen so that the center of each hypercube has integer coordinates. The hypercubes will be called "spels" herein (an abbreviation for "space elements"). When n=2, spels are called pixels, and when n=3 they are called voxels. The coordinates of a center of a spel are an n-tuple of integers, defining a point in $Z^n$. For any spel c and for $1 \leq j \leq n$, $c_j$ denotes the jth coordinate of the center of c. $Z^n$ itself is thus the set of all spels in $R^n$ with the above interpretation of spels. In the remainder of this application, the concepts of spels and points in $Z^n$ will be used interchangeably.

A fuzzy relation $\alpha$ in $Z^n$ is a fuzzy spel adjacency if it is reflexive and symmetric. It is desirable that $\alpha$ be such that $\mu_\alpha(c,d)$ is a non-increasing function of the distance $\|c-d\|$ between c and d, where $\|.\|$ represents any L2 norm in $R^n$.

An example of fuzzy spel adjacency is the fuzzy relation $\omega$ defined by $$\mu_\omega(c,d) = \frac{1}{1 + k_1 \left( \sqrt{\sum_{i=1}^{n} (c_i - d_i)^2} \right)}, \text{ if } \sum_{i=1}^{n} |c_i - d_i| \leq n$$

$$0, \text{ otherwise,}$$

Equation 8

$k_1$ being a non-negative constant. Upon review of the articles to Kong et al. entitled "Digital Topology: Introduction and Survey," *Computer Vision, Graphics, and Image Processing*, Vol. 48, 1989, pp. 357–393; to Herman entitled "Discrete Multidimensional Jordan Surfaces," *CVGIP: Graphical Models and Image Processing*, Vol. 54, 1992, pp. 507–515; and to Udupa entitled "Multidimensional Digital Boundaries," *CVGIP: Graphical Models and Image Processing*, Vol. 50, No. 4, 1994, pp. 311–323, it is easily verified that the hard adjacency relations commonly used in digital topology are special cases of fuzzy spel adjacencies.

The pair $(Z^n,\alpha)$, where $\alpha$ is a fuzzy spel adjacency, is called herein a fuzzy digital space. Fuzzy digital space is a concept that characterizes the underlying digital grid system independent of any image-related concepts. This concept will be tied with image-related concepts below to arrive at fuzzy object related notions.

C. Scenes, Membership Scenes, Binary Scenes, Slices of C, Classification, and Segmentation A scene over a fuzzy digital space $(Z^n,\alpha)$ is a pair C=(C,f), where C={c|$-b_j \leq c_j \leq b_j$ for some $b \in Z_+^n$}, $Z_+^n$ is the set of n-tuples of positive integers, f is a function whose domain is C, called the scene domain, and whose range is a set of numbers. C is a membership scene over $(Z^n,\alpha)$ if C is a scene over $(Z^n,\alpha)$ in which the range of f is a subset of the closed unit interval [0,1]. C is a binary scene over $(Z^n,\alpha)$ if C is a membership scene over $Z^n$ in which the range of f is {0,1}. C is said to be nonempty if there exists $c \in C$ such that $f(c) \neq 0$. A set of all spels $c \in C$, all but two of whose coordinates $c_i,c_j$ are fixed, together with the restriction of f to that set, is called herein a $c_i c_j$ slice of C.

Scenes contain information about "objects" that have been imaged. Spel values in a membership scene constitute the membership of spels in a particular "object" of interest. The notion of a membership scene is for developing fuzzy object concepts. The purpose of an imaging operation, such as CT scanning, is indeed to get membership scenes. If the scene representing acquired image data already portrays object membership adequately, there is no need for the secondary concept of a membership scene, and the scene itself, but for a linear scaling of its values, can be treated as a membership scene. That the range of f in a membership scene (C,f) over $(Z^n,\alpha)$ by [0,1] is a theoretical requirement that stems from the need to handle fuzzy concepts. However, for implementations, the range of f can be taken to be the range of the original scene values themselves. In general, however, spel values in scenes do not represent directly their degree of membership in objects. For example, a spel may have a low value, yet it may have higher membership in a certain object. An ideal membership scene should contain only the object of interest with the spel values indicating as closely as possible the degree of membership of spels in the object. Any process that converts a scene to a membership scene will be called n-classification. n-segmentation is any process that converts a scene over $(Z^n,\alpha)$ to a binary scene over $(Z^n,\alpha)$. The purpose of n-segmentation may be considered to identify the object of interest as a hard subset of the scene domain, while the purpose of n-classification may be considered to identify the object of interest as a fuzzy subset of the scene domain.

In the following description, it is assumed that a membership scene over $(Z^n,\alpha)$ is provided.

D. Fuzzy Spel Affinities

If C=(C,f) is a membership scene over $(Z^n,\alpha)$, any fuzzy relation $\kappa$ in C is said to be a fuzzy spel affinity in C if it is reflexive and symmetric. In practice, $\kappa$ should be such that $\mu_\kappa(c,d)$ is a function of $\mu_\alpha(c,d)$ and of f(c) and f(d) and perhaps even of c and d themselves.

An example of fuzzy spel affinity is the fuzzy relation $\zeta$ defined as follows. Let C=(C,f) be a membership scene over $(Z^n,\omega)$, where $\omega$ is as defined in Equation 8. For all (c,d) $\in C \times C$ $\mu_\zeta(c,d)$ is defined as:

$$\mu_\zeta(c,d) = \frac{\mu_\omega(c,d)}{1 + k_2|f(c) - f(d)|},$$

Equation 9 where $k_2$ is a non-negative constant. It is easy to verify that $\zeta$ is a fuzzy spel affinity in C. Clearly, the closer c and d are to each other in location and in their membership values in C, the greater is their affinity.

The functional form used for fuzzy spel affinity can be much more sophisticated than the example in Equation 9. Note that there is no requirement of "localness" for this relation. In fact, it may even be "shift-variant" in the sense that spel affinity may depend on where c and d are in C. For computational reasons described in following sections, however, some of these restrictions may have to be brought in.

E. Path, Fuzzy $\kappa$-Net

If it is assumed that C=(C,f) is a membership scene over a fuzzy digital space $(Z^n,\alpha)$ and $\kappa$ is a fuzzy spel affinity in C, then a nonempty path $p_{cd}$ in C from a spel $c \in C$ to a spel $d \in C$ is a sequence $<c^{(1)}, c^{(2)}, \ldots, c^{(m)}>$ of $m \geq 2$ spels, all in C, such that $c^{(1)}$=c and $c^{(m)}$=d. The successive spels in the sequence can be any elements of C. An empty path in C from c to d, denoted $<>$, is a sequence of no elements. The set of all (empty and nonempty) paths in C from c to d is denoted by $P_{cd}$. $P_c$ is used to denote the set of all paths in C, defined as $$P_c = \bigcup_{(c,d) \in C \times C} = P_{cd}$$

The fuzzy $\kappa$-net N of C is a fuzzy subset of $P_c$ with its membership function defined as follows:

for all p=$<c^{(1)}, c^{(2)}, \ldots, c^{(m)}> \in P_c$, $\mu_N(p) = \min [\mu_\kappa(c^{(1)},c^{(2)}),\mu_\kappa(c^{(2)},c^{(3)}), \ldots, \mu_\kappa(c^{(m-1)}, c^{(m)})]$, Equation 10a $\mu_N(<>) = 0$.

Equation 10b

A binary join to operation on $P_c$, denoted "+", is defined as follows. For any two nonempty paths $p_{cd}=<c^{(1)},c^{(2)}, \ldots, c^{(m)}> \in P_c$ and $p_{de}=<d^{(1)},d^{(2)}, \ldots, d^{(l)}> \in P_c$, $$p_{cd}+p_{de}<c^{(1)},c^{(2)},\ldots,c^{(m)},d^{(2)},d^{(3)},\ldots,d^{(l)}>, \quad \text{Equation 11a}$$

$$p_{cd}+<>=p_{cd}, \quad \text{Equation 11b}$$

and $$<>+p_{de}=p_{de}, \quad \text{Equation 11c}$$

and $$<>+<>=<>. \quad \text{Equation 11d}$$

However, the join of $p_{de}$ to $p_{cd}$ is not defined if $e \neq c$.

It can also be shown that, for any membership scene $C=(C,f)$ over any fuzzy digital space $(Z^n,\alpha)$ and for any spels $c, e \in C$, $$P_{ce}=\{p_{cd}+p_{de} | d \in C \text{ and } p_{cd} \in P_{cd} \text{ and } p_{de} \in P_{de}\}. \quad \text{Equation 12}$$

since if $p \in P_{cd}$ and $p' \in P_{de}$ for any $d \in C$, then $p+p' \in P_{ce}$. Conversely, if $p_{ce}=<c^{(1)},c^{(2)},\ldots,c^{(m)}> \in P_{ce}$, and if $m>2$, then there exists $j$, $1<j<m$, such that $c^j \in C$, $p_{cc}^{(j)}=<c^{(1)}, c^{(2)}, \ldots, c^{(j)}> \in P_{cc}^{(j)}$, $P_{c^{(j)}e}=<c^{(j)}),c^{(j+1)},\ldots,c^{(m)}> \in P_{c^{(j)}e}$, and $p_{ce}=p_{cc}^{(j)}+p_{c^{(j)}e}$. If $m=2$, then $p_{ce}=<c,e>+<>$, and if $p_{ce}$ is the empty path, then $p_{ce}=<>+<>$. In all cases, $p_{ce}$ is an element of the set on the right side of Equation 12.

F. FUZZY κ-Connectedness K, Binary Relation $K_\theta$

If $C=(C,f)$ is a membership scene over $(Z^n,\alpha)$, if κ is a fuzzy spel affinity in C, and if N is the fuzzy κ-net of C, then fuzzy κ-connectedness in C, denoted K, is a fuzzy relation in C defined as follows. For all $c,d$ in C, $$\mu_K(c,d) = \max_{p \in P_{cd}} [\mu_N(p)]. \quad \text{Equation 13}$$

(For fuzzy connectedness, the uppercase form of the symbol used to represent the corresponding fuzzy spel affinity will be used herein.)

The intuitive idea underlying the principle of fuzzy connectedness as described herein is to assign to every pair of spels (c, d) in C a "strength of connectivity" between them. This strength is determined as follows. There are numerous possible paths between c and d (expressed by the set $P_{cd}$). Along each path p, there is a "weakest link" (in the sense of the smallest affinity between spels along p) that determines the strength of connectivity along p. The actual "strength of connectivity" from c to d is the maximum of the "strength" of all paths. In the definition of "strength", α, C, and κ all play important roles.

It is vital to the development of the notion of fuzzy objects that, for any fuzzy spel affinity κ in any membership scene C over any fuzzy digital space $(Z^n,\alpha)$, fuzzy κ-connectedness K in C is a similitude relation in C. This can be proven by showing that when N is the fuzzy κ-net of C, for any spel $c \in C$, $$\mu_K(c,c) = \max_{p \in P_{cc}} [\mu_N(p)] = \mu_K(c,c) = 1.$$

So K is reflexive. For any spels $c,d \in C$, there is a one-to-one correspondence between $P_{cd}$ and $P_{dc}$, as follows: If $p_{cd}=<c^{(1)}, c^{(2)}, \ldots, c^{(m)}> \in P_{cd}$, then the corresponding element of $P_{dc}$ is $p_{dc}=<c^{(m)},c^{(m-1)}, \ldots, c^{(1)}>$. Clearly, $\mu_N(p_{cd})=\mu_N(p_{dc})$. Therefore, $$\mu_K(c,d) = \max_{p_{cd} \in P_{cd}} [\mu_N(p_{cd})] = \max_{p_{dc} \in P_{dc}} [\mu_N(p_{dc})] = \mu_K(d,c),$$

establishing the symmetry of K.

For any $c, e \in C$, by Equation 13, $$\mu_K(c,e) = \max_{p_{ce} \in P_{ce}} [\mu_N(p_{ce})]$$

$$= \max_{d \in C} [\mu_N(p_{cd}+p_{de})], \text{ by Equation 12},$$

$$= \max_{d \in C} \left[ \max_{\substack{p_{cd} \in P_{cd} \\ p_{de} \in P_{de}}} \left[ \max_{p_{de} \in P_{de}} [\min(\mu_N(p_{cd}), \mu_N(p_{de}))] \right] \right]$$

$$= \max_{d \in C} \left[ \max_{p_{cd} \in P_{cd}} \left[ \min \left[ \max_{p_{de} \in P_{de}} (\mu_N(p_{de})), \mu_N(p_{cd}) \right] \right] \right]$$

$$= \max_{d \in C} \left[ \min \left[ \max_{p_{cd} \in P_{cd}} (\mu_N(p_{cd})), \max_{p_{de} \in P_{de}} (\mu_N(p_{de})) \right] \right]$$

$$= \max_{d \in C} [\min(\mu_K(c,d), \mu_K(d,e))], \text{ by Equation 13},$$

establishing the transitivity of K.

To define the notion of a fuzzy connected component, the following binary relation $K_\theta$ based on the fuzzy relation K is needed. θ denotes any subset of [0, 1] and, for $0 \leq x \leq 1$, $\theta_x=[x, 1]$.

If $C=(C,f)$ is a membership scene over a fuzzy digital space $(Z^n,\alpha)$, and κ is a fuzzy spel affinity in C, then for all $c,d \in C$ and for any $\theta \subset [0,1]$, a (hard) binary relation $K_\theta$ in C is defined as follows:

$$\mu_{K_\theta}(c,d) = \begin{cases} 1, & \text{iff } \mu_K(c,d) \in \theta, \\ 0, & \text{otherwise} \end{cases} \quad \text{Equation 14}$$

Also, for any membership scene $C=(C,f)$ over any fuzzy digital space $(Z^n,\alpha)$, for any $x \in [0,1]$, and for any fuzzy κ-connectedness K in C, $K_{\theta_x}$ is an equivalence relation in C. In other words, $K_{\theta_x}$ is reflexive since K is reflexive.

Since $\mu_K(c,d)=\mu_K(d,c)$ for all $c,d \in C$, either $\mu_{K_{\theta_x}}(c,d)=\mu_{K_{\theta_x}}(d,c)=1$ (when $\mu_{K_{\theta_x}}(c,d) \in \theta_x$) or $\mu_{K_{\theta_x}}(c,d)=\mu_{K_{\theta_x}}(d,c)=0$ (when $\mu_{K_{\theta_x}}(c,d) \notin \theta_x$). So $K_{\theta_x}$ is symmetric.

Since K is transitive, for all (c,d), (d,e), (c,e) in C×C, $$\mu_K(c,e) = \max_{d \in C} [\min[\mu_K(c,d), \mu_K(d,e)]]. \quad \text{Equation 15}$$

Now, if $\mu_{K_{\theta_x}}(c,g)=1=\mu_{K_{\theta_x}}(g,e)$ for some $c,g,e \in C$, then by Equation 15:

$$\mu_K(c,e) \geq \min [\mu_K(c,g), \mu_K(g,e)]. \quad \text{Equation 16}$$

Since $\mu_K(c,g) \geq x$ and $\mu_K(g,e) \geq x$, by Equation 16 $\mu_K(c,e) \geq x$. Hence, $\mu_{K_{\theta_x}}(c,e)=1$, establishing the transitivity of $K_{\theta_x}$.

G. Fuzzy κ-Components, Fuzzy κθ-Objects, Fuzzy Object Extraction, Fuzzy Object Labelling If $C=(C,f)$ is a membership scene over a fuzzy digital space $(Z^n,\alpha)$, κ is a fuzzy spel affinity in C, $x \in [0,1]$, and $O_{\theta_x}$ is an equivalence class of the relation $K_{\theta_x}$ in C, then a fuzzy κ-component $O_{\theta_x}$ of C of strength $\theta_x$ is a fuzzy subset of C defined by the membership function $$\mu_{O_{\theta_x}}(c) = \begin{cases} f(c), & \text{if } c \in O_{\theta_x} \\ 0, & \text{otherwise.} \end{cases} \quad \text{Equation 17}$$

The notation $[o]_{\theta_x}$ will be used to denote the equivalence class of $K_{\theta_x}$ that contains o for any $o \in C$.

The fuzzy κ-component of C of strength $\theta_x$ that contains o, denoted $O_{\theta_x}(o)$, is a fuzzy subset of C whose membership function is:

$$\mu_{O_{\theta_\chi(o)}}(c) = \begin{cases} f(c), & \text{if } c \in [o]_{\theta_\chi} \\ 0, & \text{otherwise.} \end{cases} \quad \text{Equation 18}$$

A fuzzy $\kappa\theta_x$-object of C is a fuzzy $\kappa$-component of C of strength $\theta_x$. For any spel $o \in C$, a fuzzy $\kappa\theta_x$-object of C that contains o is a fuzzy $\kappa$-component of C of strength $\theta_x$ that contains o.

Given C, $\kappa$, $\alpha$, and $x \in [0,1]$, and any spel $o \in C$, the process of finding the fuzzy $\kappa\theta_x$-object that contains o is referred to as n-fuzzy object extraction. The process of finding all fuzzy $\kappa\theta_x$-objects of C, given C, $\kappa$, $\alpha$ and $x \in [0,1]$, is referred to as n-fuzzy object labelling. In practice, n-fuzzy object extraction and labelling may be done directly on scenes (ignoring the theoretical requirement of the spel value range to be [0,1] for membership scenes and treating the given scene itself as a membership scene). Therefore, these processes can also be considered as solutions to the n-classification problem.

Both n-fuzzy object extraction and labelling are computationally formidable processes even for the case n=2. Any method for these processes that proceeds directly from the definitions will be computationally impractical. However, there are certain properties of fuzzy $\kappa\theta_x$-objects which when exploited can lead to computationally practical algorithms for these processes. These properties will be discussed in Section H below.

H. Properties of Fuzzy $\kappa\theta_x$-Objects

A property analogous to that of hard connected components follows for fuzzy $\kappa$-components directly from the finding that $K_{\theta x}$ is an equivalence relation in C. Namely, it can now be shown that any membership scene C=(C,f) over any fuzzy digital space $(Z^n, \alpha)$ for any fuzzy spel affinity $\kappa$ in C and for any $x \in [0,1]$, that the set $$\{O_{\theta_x}^{(1)}, O_{\theta_x}^{(2)}, \ldots, O_{\theta_x}^{(l)}\}$$

of all distinct fuzzy $\kappa\theta_x$-objects of C satisfies the following:

For $1 \leq i,j \leq l$, and $i \neq j$, $O_{\theta_\chi}^{(i)} \cap O_{\theta_\chi}^{(j)} = \Phi$. (i)

$$\bigcup_{1 \leq i \leq l} O_{\theta_\chi}^{(i)} = C.$$ (ii)

(i) Follows from the disjointness of distinct equivalence classes of $K_{\theta x}$ and from the definition of fuzzy $\kappa_{\theta x}$-objects. (ii) Follows from the fact that the equivalence classes of $K_{\theta x}$ partition C and from the definition of fuzzy $\kappa$-components of C of strength $\theta_x$.

The following finding leads to one of the main results that has significant computational consequences for n-fuzzy object extraction in accordance with the invention. Namely, if C=(C,f) is any membership scene over any fuzzy digital space $(Z^n, \alpha)$, $\kappa$ is any fuzzy spel affinity in C, $x \in [0,1]$, and o is any element of C, then a special subset $\Omega_{\theta_x}(o)$ of C may be defined as:

$$\Omega_{\theta_\chi}(o) = \{c \in C | \mu_K(o,c) \in \theta_\chi\}. \quad \text{Equation 19}$$

Then, $\Omega_{\theta x}(o) = [o]_{\theta x}$. This can be proven by showing that for any spel $c \in [o]_{\theta x}$, by Equation 14, $\mu_{K\theta x}(o,c)=1$, implying that $\mu_K(o, c) \in \theta_x$. Hence, by Equation 19, $c \in \Omega_{\theta x}(o)$, and thus $[o]_{\theta x} \subset \Omega_{\theta x}(o)$.

For any spel $c \in \Omega_{\theta x}(o)$, by Equations 19 and 14, $\mu_{K\theta x}(o,c)=1$, and since $K_{\theta x}$ is an equivalence relation in C, $c \in [o]_{\theta x}$. Therefore, $\Omega_{\theta x}(o) \subset [o]_{\theta x}$.

The following theorem also provides practical methods for n-fuzzy object extraction. Namely, for any membership scene C=(C,f) over any fuzzy digital space $(Z^n, \alpha)$, for any fuzzy spel affinity $\kappa$ in C, for any $x \in [0,1]$, and for any spel $o \in C$, the fuzzy $\kappa\theta_x$-object $o_{\theta x}(o)$ containing o is given by the membership function:

$$\mu_{O_{\theta_\chi}(o)}(c) = \begin{cases} f(c), & \text{if } c \in \Omega_{\theta_\chi}(o) \\ 0, & \text{otherwise} \end{cases} \quad \text{Equation 20}$$

This result follows from Equation 18 and the finding that $\Omega_{\theta x}(o) = [o]_{\theta x}$.

This result is quite remarkable especially considering the minimal restrictions that are put on the functional forms of $\mu_\alpha$ and $\mu_\kappa$. Equation 20 implies that for finding the fuzzy $\kappa\theta_x$-object containing o, it is not necessary to compute $\mu_K(c,d)$ for each possible pair (c,d) of spels in C. Rather, it is sufficient to compute $\mu_K(o,c)$ for each spel $c \in C$. This is a vast reduction in combinatorial complexity. Despite this simplification, it is still necessary to determine all possible paths from o to each $c \in C$, and for each such path, to evaluate Equation 10. Efficient algorithms for carrying out this computation will be described in the next section.

Given that such a method for n-fuzzy object extraction is available, the following result suggests a solution to the n-fuzzy object labelling problem. Namely, if C=(C,f) is any membership scene over any fuzzy digital space $(Z^n, \alpha)$, $\kappa$ is any fuzzy spel affinity in C, $x \in [0,1]$, $o_{\theta x}^{(1)}, o_{\theta x}^{(2)}, \ldots, o_{\theta x}^{(l)}$ is the set of all distinct $\kappa\theta_x$-objects of C, and $o^{(1)}, o^{(2)}, \ldots, o^{(l)}$ are spels that are contained in $o_{\theta x}^{(1)}, o_{\theta x}^{(2)}, \ldots, o_{\theta x}^{(l)}$, respectively, then For $1 \leq i,j \leq l$, and $i \neq j$, $\Omega_{\theta_\chi}(o^{(i)}) \cap \Omega_{\theta_\chi}(o^{(j)}) = \Phi$, (i)

$$\bigcup_{1 \leq i \leq l} \Omega_{\theta_\chi}(o^{(i)}) = C.$$ (ii)

follow from the above description leading to Equation 20.

The following result specifies the necessary (but not sufficient) condition for the inclusion relationship among fuzzy $\kappa\theta_x$-objects. Namely, for any membership scene C=(C,f) over any fuzzy digital space $(Z^n, \alpha)$, for any fuzzy spel affinity $\kappa$ in C, for any spel $o \in C$, and for any $t, y \in [0,1]$, $O_{\theta y}(o) \subset O_{\theta t}(o)$ if $t \leq y$. This follows since for any spel $c \in [o]_{\theta y}$, $\mu_K(o,c) \in \theta y$, which implies that $\mu_K(o,c) \in \theta_t$ since $\theta_y \subset \theta_t$. Hence, $\mu_{K\theta t}(o,c)=1$, and since $K_{\theta t}$ is an equivalence relation, $c \in [o]_{\theta t}$. Thus, whenever $$c \in [o]_{\theta_y}, \mu_{O_{\theta y}(o)}(c) = \mu_{O_{\theta t}(o)}(c).$$

For $c \in C - [o]_{\theta_y}, \mu_{O_{\theta y}o}(c) = 0$ By Equation 18.

Thus, $O_{\theta_y}(o) \subset O_{\theta t}(o)$.

The inventors have also observed that the notion of $\kappa\theta_x$-objects and their properties for certain special subsets $\theta_x$ of [0,1] can be generalized to more general subsets of [0,1] with similar attendant properties.

II. TECHNIQUES FOR n-FUZZY OBJECT EXTRACTION AND n-FUZZY OBJECT LABELLING

The inventors have developed techniques for n-fuzzy object extraction and n-fuzzy object labelling which are implemented using a Sun Sparc 10/51 Workstation programmed in C using X-Windows. As will be described below, the workstation receives three dimensional pixel data resulting from, for example, an MR imaging of a patient, and processes the data to extract and identify n-fuzzy objects in accordance with the techniques of the invention. The identified objects may then be quantified for use in diagnosis, and the like.

A. Fuzzy Object Extraction

Two algorithms for n-fuzzy object extraction will be described, both based on dynamic programming techniques.

In the first algorithm, called $\kappa\theta_x FOE$, the value of $\theta_x$ is specified, and the algorithm makes essential use of this predetermination. In the second algorithm, called $\kappa FOE$, it is not assumed that $\theta_x$ is known. $\kappa\theta_x FOE$ terminates faster than $\kappa FOE$ for two reasons. First, when $\theta_x$ is known in advance, there is no need to find the best path $p_{oc}$ from o (the spel contained in the fuzzy $\kappa\theta_x$-object of C to be extracted) to c∈C such that $\mu_K(o,c) = \mu_N(p_{oc})$ (Equation 13). Rather, it is enough to find a path $p'_{oc}$ such that $\mu_N(p'_{oc}) \geq x$. When the first $p'_{oc}$ satisfying this condition is found, the search for the best path from o to c can be stopped. Second, certain computations can be avoided for those spels d∈C for which $\mu_K(o,d) < x$.

Although $\kappa FOE$ terminates slower, it has the practical advantage that x can be specified interactively after the algorithm terminates and thereby it becomes possible to choose the appropriate "strength of connectivity" to define the fuzzy $\kappa\theta_x$-object properly. The algorithm essentially outputs a scene expressing "strength of connectivity" between o and all c∈C. This scene is called the $K_o$-scene $C_o$ of C defined by $C_o=(C_o,f_o)$, where $C_o=C$ and for all c∈$C_o$, $f_o(c)=\mu_K(o,c)$. By thresholding this scene at various values x, the various fuzzy $\kappa\theta_x$-objects that result can be examined. This scene has interesting properties that are relevant to n-classification, n-segmentation, and in shell rendering and manipulation of $\kappa\theta_x$-objects which are not described herein. It should also be noted that whenever $f_o(c) \geq x$ and $f_o(d) \geq x$ for any spels c,d∈C, the transitivity of K guarantees that $\mu_K(c,d) \geq x$.

As a compromise between speed and practical utility, it is preferred to run $\kappa\theta_x FOE$ for x>0 but for a sufficiently smaller value than the "strength of connectivity" y expected for the object of interest. This will ensure that the algorithm will terminate substantially faster than $\kappa FOE$, and, because $O_{\theta y}(o) \subset O_{\theta t}(o)$ if $t \leq y$, the convenience of deciding and choosing the value of y after the termination of the algorithm is retained. This is the mode in which $\kappa\theta_x FOE$ is used in all of the inventors' current applications involving massive data.

Preferred embodiments of the two algorithms follow. A knowledge of dynamic programming is not essential to understand or to implement these algorithms but is helpful in appreciating and understanding the performance of these algorithms.

$\kappa\theta_x FOE$

Input: C,o,κ and $\theta_x$ as defined above.
Output: $O_{\theta x}(o)$ as defined above.
Auxiliary Data Structures: An nD array representing the $K_o$-scene $C_o=(C_o,f_o)$ of C and a queue Q of spels. For purposes of the algorithm, the array itself is referred to by $C_o$.

*begin*
0.  set all elements of $C_o$ to 0 except *o* which is set to 1;
1.  push all spels $c \in C_o$ such that $\mu_K(o,c) > 0$ to Q;
    *while* Q is not empty *do*
2.      remove a spel *c* from Q;
3.      *if* $f_o(c) < x$ *then*
4.          find $f_{max} = \max_{d \in C_o}$ [min $(f_o(d), \mu_K(c,d))$];
5.          *if* $f_{max} > f_o(c)$ and $f_{max} \geq x$ *then*
6.              set $f_o(c) = f_{max}$;
7.              push all spels *e* such that $\mu_K(c,e) > 0$ to Q;
            *endif*;

*endif*;
*endwhile*;
8.  Create and output $O_{\theta x}(o)$ by assigning to those spels *c* in $C_o$ for which $f_o(c) \neq 0$ the value $f(c)$, and to the rest the value 0;
*end*
$\kappa FOE$ Input: C,o,κ as defined above.
Output: $K_o$-scene $C_o=(C_o,f_o)$ of C.
Auxiliary Data Structures: An nD array representing the $K_o$-scene $C_o=(C_o,f_o)$ of C and a queue Q of spels. For purposes of the algorithm, the array itself is referred to by $C_o$.

*begin*
0.  set all elements of $C_o$ to 0 except *o* which is set to 1;
1.  push all spels *c* of $C_o$ such that $\mu_K(o,c) > 0$ to Q;
    *while* Q is not empty *do*
2.      remove a spel *c* from Q;
4.      find $f_{max} = \max_{d \in C_o}$ [min $(f_o(d), \mu_K(c,d))$];
5.      *if* $f_{max} > f_o(c)$ *then*
6.          set $f_o(c) = f_{max}$;
7.          push all spels *e* such that $\mu_K(c,e) > 0$ to Q;
        *endif*;
    *endwhile*;
*end*

To generate the fuzzy $\kappa\theta_x$-object containing o, $C_o$ should be thresholded at x and Step 8 of Algorithm $\kappa\theta_x FOE$ should be applied.

The algorithms are both iterative and they work as follows. Within the iterative loop, a spel c of C is examined to see if the paths from o coming up to each spel d can be expanded unto c itself profitably (Steps 4, 5). Which of the spels d actually matters depends on α. If fuzzy spel adjacency α is taken to be any of the commonly used hard adjacency relations, then the spels that matter are just the immediate neighbors. The array $C_o$, which will eventually contain the $K_o$-scene, contains the "strength of connectivity" $\mu_K(o,d)$ for the individual elements d of $C_o$. To determine the profitable expendability of paths unto c, a min-max test is done in Step 4, and if a "stronger" path is found (in Step 5) the higher "strength" is assigned to c (in Step 6).

The standard dynamic programming algorithm consists of essentially Step 0 and the iteratively executed Steps 4, 5 and 6. The termination condition is that no more changes can be made in array $C_o$ (in Step 6). Steps 1, 2, and 3 are included essentially for improving efficiency.

When algorithms $\kappa\theta_x FOE$ and $\kappa FOE$ terminate, they output respectively the fuzzy $\kappa\theta_x$-object containing o and the $K_o$-scene of C. The modifications introduced by the present inventors are essentially the introduction of Steps 1 and 7 in Algorithm $\kappa FOE$ and of Steps 1, 3 and 7 in Algorithm $\kappa\theta_x FOE$. Steps 1 and 7 do not affect the termination of $\kappa FOE$ and do not make the output $\kappa FOE$ different from that of the standard dynamic programming algorithm. This can be proven by supposing a spel e such that $\mu_K(c,e)=0$ is pushed into Q in Step 1 or 7. Upon the removal of e in Step 2, $f_{max}$ will be 0 in Step 4, and so Steps 6 and 7 will not be executed.

The correctness of $\kappa\theta_x FOE$ is proven by observing that the value assigned to every spel in $C_o$ never decreases with the increasing iteration number of the do-while loop. Indeed, the outputs of $\kappa\theta_x FOE$ with and without Step 3 are identical. This can be shown by letting c be the first spel for which $f_o(c)(=x') \geq x$ in Step 3. (At least one such spel must exist since $f_o(o)=1$.) If Step 3 is ignored and Steps 4 onward are carried out, and if $f_o(c)$ was updated in Step 6 to x" (if this did not happen, there is nothing to prove), where x">x', and a spel e for which $\mu_\kappa(c,e)>0$ is put in Q in Step 7 (if no such spel exists, there is nothing to prove), then, when this spel is removed from Q in Step 2 at a later time, there are two cases to consider for e in Step 3: $f_o(e) \geq x$ and $f_o(e)<x$. In the first case, obviously, the change in value of e from x' to x" did not cause e to attain $f_o(e) \geq x$. In the second case, it is easy to check that e's value will not change from $f_o(e)<x$ to $f_o(e) \geq x$ because of just the change in value of e from x' to x". Therefore, the output in Step 8 will be identical with or without Step 3.

Since Algorithm κFOE is practically more useful, although less efficient, than Algorithm $\kappa\theta_x$FOE, the rest of the discussion in this section will refer to κFOE. Nonetheless many of these remarks apply to $\kappa\theta_x$FOE as well.

The computational cost of κFOE is determined mainly by α and κ. Obviously, the larger the "neighborhood" of α (i.e., the number of spels d for which $\mu_\alpha(c,d)>0$) the more expensive Steps 4 and 7 are likely to be. The functional form of $\mu_\kappa$ actually determines the cost of Steps 4 and 7. Since for many spels c, $\mu_\kappa(c,d)$ is evaluated more than once, it is advisable to store these values when they are first computed if adequate fast storage space is available. (Note that it is enough to store one of $\mu_\kappa(c,d)$ and $\mu_\kappa(d,c)$ since κ is symmetric.) It is possible that in Step 7 a spel e that is to be pushed into Q is already in Q. In some cases, it may be possible to search for e in Q less expensively than the cost incurred in the repeated subsequent computation for multiple copies of e that are otherwise needed.

B. Fuzzy Object Labelling

In this section, an algorithm is described, called $\kappa\theta_x$FOL, which uses Algorithm $\kappa\theta_x$FOE to solve the n-fuzzy object labelling problem.

$\kappa\theta_x FOL$

Input: C, κ, and $\theta_x$ as described above.
Output: The set of all $\kappa\theta_x$-objects of C.
Auxiliary Data Structures: A list C' of spels which initially contains one copy of every spel in C.

---

*begin*
0.     put a copy of every spel C into C';
 *repeat*
1.         remove a spel *o* from C';
2.         find the fuzzy $\kappa\theta_x$-object $O_{\theta x}$ (*o*) of C that contains *o* using Algorithm $\kappa\theta_x FOE$;
3.         output $O_{\theta x}(o)$;;
4.         remove spels of $[o]_{\theta x}$ that are in C' from C';
 *until* C' is empty;
*end*

---

Those skilled in the art will appreciate from the above that Algorithm $\kappa\theta_x$FOL also terminates. When it does, it outputs one copy of every $\kappa\theta_x$-object of C.

The above algorithm is rather straightforward as it essentially finds all equivalence classes in C of the binary relation $K_{\theta x}$ defined in Equation 14. Although not pursued here, the ideas underlying (hard) connected component labelling algorithms as described by, e.g., Udupa et al. in "Boundary and Object Labelling in Three-Dimensional Images," *Computer Vision, Graphics, and Image Processing*, Vol. 51, 1990, pp. 355–369, may be combined with Algorithm $\kappa\theta_x$FOE to yield interesting results.

In many situations, the number of spels in the set $\Omega_{\theta x}(o)$ (defined in Equation 19) for x>0 may be just 1; that is, the set contains only o. For example, if C represents the membership scene of the bones of a joint, there are many spels in C that do not contain any bone. For each such spel o, $\Omega_{\theta x}(o)$ will be a singleton set (this is because fuzzy κ-connectedness K is reflexive). The problem of finding all bones of the joint, each expressed as a fuzzy $\kappa\theta_x$-object, however, is certainly legitimate. Algorithm $\kappa\theta_x$FOL is easily modified to skip all singleton-set components so that only the real bone components are extracted.

III. APPLICATIONS IN IMAGE SEGMENTATION

In this section, the use of the theory and of the algorithms described above will be demonstrated for image segmentation based on several examples drawn from medical imaging. First, however, some of the issues left open above will be explained in the image segmentation context.

A. Selection of Fuzzy Spel Adjacencies and Fuzzy Spel Affinities

In all results presented in this section, α was chosen to be a hard adjacency relation: 4-adjacency for n=2 and 6-adjacency for n=3. That is, for all c, d in C, $$\mu_\alpha(c,d) = \begin{cases} 1, & \text{if } \sqrt{\sum_i (c_i - d_i)^2} \leq 1 \\ 0, & \text{otherwise} \end{cases} \quad \text{Equation 21}$$

The general form of $\mu_\kappa$ can be written as follows. For all C, d∈C, $$\mu_\kappa(c,d) = h(\mu_\alpha(c,d), f(c), f(d), c, d), \quad \text{Equation 22}$$

where h is a scalar-valued function with range [0, 1]. The dependence of h on the location of spels indicates that it may be "shift variant". For the results presented in this section, $\mu_\kappa(c,d)$ was independent of c and d with the following form. For all c,d∈C, $$\mu_\kappa(c,d) = \mu_\alpha(c,d) \sum_{i=1}^{T} \omega_i h_i(f(c), f(d)), \text{ if } c \neq d, \quad \text{Equation 23a}$$

$$\mu_\kappa(c,c) = 1, \quad \text{Equation 23b}$$

where $\omega_i$ are free parameters satisfying $$\sum_{i=1}^{T} \omega_i = 1, \quad \text{Equation 23c}$$

and T represents the number of terms used. The functional forms for $h_i$ are chosen from one of the following.

$$g_1(f(c), f(d)) = e^{-\frac{1}{2} [\frac{\frac{1}{2}(f(c)+f(d))-m_1}{s_1}]^2} \quad \text{Equation 24a}$$

$$g_2(f(c), f(d)) = e^{-\frac{1}{2} [\frac{|f(c)-f(d)|-m_2}{s_2}]^2} \quad \text{Equation 24b}$$

$$g_3(f(c), f(d)) = 1 - g_1(f(c), f(d)), \quad \text{Equation 24c}$$

$$g_4(f(c), f(d)) = 1 - g_2(f(c), f(d)). \quad \text{Equation 24d}$$

In these expressions, $m_1, m_2$ and $s_1, s_2$ represent the mean and standard deviation of spel values and their differences (gradient magnitudes) in the membership scene for spels that are in the object of interest. For illustration, by choosing T=1, $h_1(f(c),f(d))=g_1(f(c),f(d))$, $\omega_1=1$, and $\omega_2=0$ in Equation 23, a fuzzy spel affinity is specified in which affinity between c and d is greater the closer their spel values are to a mean (expected) spel value $m_1$. By choosing T=2, $h_1(f(c),f(d))=g_1(f(c),f(d))$, $h_2(f(c),f(d))=g_4(f(c),f(d))$ and appropriate values for $\omega_1$, and $\omega_2$ (say, $\omega_1=\omega_2=0.5$), an additional boundary constraint is introduced which makes the affinity between c and d lower when the gradient (difference) between their values is closer to a mean gradient value $m_2$. This component may be thought of as representing enmity (reverse affinity) between c and d. Clearly, a variety of other more sophisticated forms can also be employed as long as they make $\kappa$ reflexive and symmetric. Obviously, in place of f(c) and f(d) any features derived from scene intensities evaluated at c and d may also be used and f(c) and f (d) may even be vector-valued. For vector-valued features, multivariate versions of Equations 24a and 24b are used:

$$g_1(f(c),f(d)) = \frac{1}{(2\pi)^{\frac{r}{s}} |S_1|^{\frac{1}{2}}} e^{-\frac{1}{2}[\frac{1}{2}(f(c)+f(d))-m_1]^t S_1^{-1}[\frac{1}{2}(f(c)+f(d))-m_1]},$$ Equation 25a $$g_2(f(c),f(d)) = \frac{1}{(2\pi)^{\frac{r}{s}} |S_2|^{\frac{1}{2}}} e^{-\frac{1}{2}[|f(c)-f(d)|-m_2]^t S_2^{-1}[|f(c)-f(d)|-m_2]},$$ Equation 25b $$g_3(f(c),f(d)) = 1 - g_1(f(c),f(d)),$$ Equation 25c
$$g_4(f(c),f(d)) = 1 - g_2(f(c),f(d)),$$ Equation 25d where f(c) and f(d) are r-component column vectors, $m_1$ and $m_2$ are r-component mean vectors, $S_1$ and $S_2$ are r×r covariance matrices, $S_1^{-1}$ and $S_2^{-1}$ are the inverses of $S_1$ and $S_2$, $|S_1|$ and $|S_2|$ are the determinants of $S_1$ and $S_2$, and $|f(c)-f(d)|$ denotes componentwise absolute difference between f(c) and f(d).

The mean and the standard deviation values in the above fuzzy spel affinities can be determined via any parameter estimation method. Any rough segmentation method such as thresholding, clustering or user painting of regions on $c_ic_j$-slices of the given scene can be used to specify spels that are very likely to belong to the object of interest. In applications involving the processing of a large number of scenes of a particular kind (such as the MR images of the brain), this estimation needs to be done only once.

B. Segmentation and Classification

To do n-segmentation, the $K_o$-scene is simply thresholded at an appropriate "strength of connectedness". This is a thresholding of the "hanging togetherness" or "abjectness" of the spels and is vastly different from thresholding of the original scene.

Since images are by nature fuzzy, it is more appropriate, and often more accurate, to do n-classification than n-segmentation. One possible approach to n-classification is to express the fuzzy $\kappa\theta_x$-object extracted from the given scene (strictly speaking, a scaled version of it to make it a membership scene) as a membership scene. Another attractive alternative is to use the $K_o$-scene $C_o=(C_o,f_o)$ with the following modification as the output membership scene: set the values of those spels c such that $f_o(c)<x$ to 0 and the values of other spels to $f_o(c)$. This is sensible since $f_o(c)$ seems to be a better indicator of "abjectness" than the spel value f (c) in the original scene.

C. Medical Imaging Examples

Several examples of n-fuzzy object extraction and n-fuzzy object classification are described in this section, all based on scenes derived from medical CT and MR imaging. In the following section, the invention is described in the context of the detection of tissues and multiple sclerosis lesions of the brain via MR imaging.

The first example, shown in FIG. 1, is for illustrating the concepts of K, $K_o$-scenes, and fuzzy $\kappa\theta_x$-objects. The scene data are obtained via CT of a patient's knee. A $c_1c_2$-slice of this scene is shown in FIG. 1a. FIG. 1b shows the $K_o$-scene for the 2D scene in FIG. 1a for a spel o selected in the dense part of the bone. Here, algorithm κFOE was run with n=2 and κ described by $\mu_\kappa(c,d)=g_2(f(c),f(d))$ (Equation 24b). The $K_o$-scene exhibits the following interesting phenomena: (i) The dense parts of the bone within the same bone in which o was specified are strongly connected to o and strongly connected amongst themselves, whereas even the dense parts in the other bones are weakly connected to o and to other spels that strongly "hang together" with o. (ii) The less dense parts of the bone are connected to o and amongst themselves with moderate strength whereas they are connected to other aspects in the scene including spels in the other bone very weakly. FIGS. 1c to 1g show the fuzzy $\kappa\theta_x$-object of this scene containing o for increasing values of x. FIGS. 1c and 1g represent somewhat the two extremes at and beyond which the object definition is clearly unacceptable. As shown, the smaller bone is very weakly connected to the bone of interest and is therefore picked up as part of the $\kappa\theta_x$-object for low values of x (FIGS. 1c and 1d). FIG. 1h is a shell rendition of all bones in the scene created using a trapezoidal opacity function, while FIG. 1i shows a shell rendition of one of the bones identified automatically as a fuzzy $\kappa\theta_x$-object. In this case, Algorithm κFOE was run with n=3.

FIG. 2 demonstrates how some of the soft-tissue regions in the scene of FIG. 1 can be identified as fuzzy $\kappa\theta_x$-objects. To make matters worse, a ramp function that increases from left to right but remains constant in the vertical direction was added to the scene of FIG. 1. The resulting scene is shown in FIG. 2a. FIG. 2b shows the $K_o$-scene for a spel o chosen in the soft-tissue blob in the lower center in FIG. 2a. It is clear how the bony regions are strongly dissimilar to and disconnected from the specified soft-tissue blob. It is also clear that spels in other soft-tissue blobs which "hang together" and which are loosely connected with the specified blob have moderate strength of connectivity. FIGS. 2c and 2d show two fuzzy $\kappa\theta_x$-objects obtained for a high and a medium value of x. FIG. 2e illustrates the functional form of $\mu_\kappa(c,d)$ used in this example which depended only on f(c) and f(d).

The example illustrated in FIG. 3 pertains to MR angiography (MRA). In particular, FIG. 3a illustrates a $c_1c_2$ slice of a 3D MR angiographic scene, where the bright spots correspond to flow in vessels. In this application, the MR imaging protocols are such that higher values representing blood flow are assigned to spels inside vessels. The clinical aim of imaging here is to identify regions of the vessels with constriction, narrowing or stenosis. A popular method of visualizing the vessels in this application is via 3D renditions created by maximum intensity projection (MIP), as described by Napel et al. in "Visualizing Three-Dimensional Flow with Simulated Streamlines and Three-Dimensional Phase-Contrast MR Imaging," *Journal of Magnetic Resonance Imaging*, Vol. 2, 1992, pp. 143–153. For example, FIG. 3b illustrates a MIP rendition of the image in FIG. 3a. FIG. 3c illustrates a shell rendition of a $\kappa\theta_x$ object of the image in FIG. 3a detected for a "medium" value of x, while FIG. 3d illustrates a MIP rendition of the $\kappa\theta_x$ object of the image in FIG. 3c. The value assigned to a pixel in a MIP rendition is the maximum of all values encountered in the scene along the line of sight associated with the pixel. Such an approach, which does not require segmentation or object model construction, is taken because the latter are very difficult in these scenes due to a variety of image artifacts. A problem with MIP is that it is accompanied by considerable clutter, and since there is no model of reflection, aspects of the vessels at different distances with respect to the viewpoint are not distinguished easily. This leads to some confusion in stationary views. However, based on over 10 patient studies conducted so far, 3-fuzzy object extraction using Algorithm κFOE seems to be an effective solution to extract vessels in MRA.

Another example is illustrated in FIG. 4. One of the main aims of the application of FIG. 4 is to identify and compute the volume of the various component tissue regions and multiple sclerosis (MS) lesions in human brains. The imaging modality used is MR. Often identification and volume computation of the tissue regions is done for image data acquired on a longitudinal basis, usually for assessing the progression of the disease or of the effect of a drug on the disease. As will be explained in more detail in the next section, over 400 scenes, some of which are vector-valued, including several longitudinal acquisitions for MS patients have been processed using the techniques of the invention with excellent results. The methodology of object identification and volume computation is quite involved, with Algorithm κFOE forming its core, and is described in more detail in the next section. Generally, the technique requires the operator to specify a few spels contained in the white matter, gray matter and the ventricle (but not in the lesions). From this point, all fuzzy $\kappa\theta_x$-objects are identified automatically using such application-specific knowledge as the fact that MS is mainly a disease of the white matter but the lesions may also occur in the gray matter and the periventricular region but never inside the ventricle or outside the brain. These criteria are easily incorporated since they can very effectively detect the component fuzzy objects.

FIGS. 4d and 4e show a $c_1c_2$-slice of a vector-valued (T2 and proton density) MR 3D scene. FIGS. 4a to 4c show $c_1c_2$-slices of the $K_o$-scenes corresponding to the white matter region, the gray matter region, and the ventricle, respectively, for this input scene. It should be noted how these displays depict "white-matterness", "gray-matterness", and "ventricleness" of spels that hang together to form the respective objects. FIG. 4f shows a $c_1c_2$-slice of the $K_o$ scene of the lesions. All fuzzy $\kappa\theta_x$-objects in this example are detected in three dimensions.

The present inventors have implemented Algorithms $\kappa\theta_x$FOE and κFOE for n=2 and n=3 within an internal version of the 3DVIEWNIX image processing software system described by Udupa et al. in "3DVIEWNIX: An Open, Transportable, Multidimensional, Multimodality, Multiparametric Imaging Software System," *SPIE Proceedings*, Vol. 2164, 1994, pp. 58–73. On a Sun Sparc 10/51 workstation, the run time for the 2D version of Algorithm κFOE is about 20 seconds and about 5 seconds for Algorithm $\kappa\theta_x$FOE even for small values of x for a scene of domain 256×256. The 2D version facilitates experimentation since it operates at interactive speeds. However, to reap the full power of these algorithms, fuzzy object extraction should be done in the natural dimensionality of the scene. The run time on a Sun Sparc 10/51 workstation for the 3D version of Algorithm κFOE is about 20 minutes for a scene of domain 256×256×64. This figure reduces to about 2 minutes for Algorithm $\kappa\theta_x$FOE for x=0.1. As noted above, running $\kappa\theta_x$FOE with a small value of x provides an optimal tradeoff between speed and the convenience of selection of the strength of connectedness after the algorithm's termination.

IV. DETECTION AND QUANTIFICATION OF MS LESIONS

FIG. 5 illustrates a preferred embodiment of a system for the detection and quantification of MS lesions in accordance with the techniques of the invention. As illustrated, image data representing T2 and proton density (PD) values are obtained from MR scanner 100 in accordance with a predetermined protocol. For example, in a preferred embodiment, the matrix size is 256×192×60; the slice thickness is 3 mm; TR=2500 ms; TE=18 ms for PD and 90 ms for T2; and the field of view is 22 cm. The acquired patient data are transmitted via, for example, a PACS network 110 to a workstation 120 embodying the invention. The received data are stored in a memory 130 until converted by data converter 140 into a format understandable by the image processing software. In a presently preferred embodiment, workstation 120 implements the 3DVIEWNIX image processing software system described in the aforementioned article to Udupa et al. Data converted into 3DVIEWNIX format is stored in 3DVIEWNIX memory 150 for all subsequent processing. Preferably, the algorithms set forth herein for n-fuzzy object extraction and n-fuzzy object labelling are implemented in the 3DVIEWNIX software system and stored in processor memory 160 for implementation by processor 170. In a preferred embodiment, workstation 120 comprises a Sun Sparc 10/51 workstation. As illustrated, the operator provides information such as starting points on a slice for the identification of 3D fuzzy objects representing white matter ("WM"), gray matter ("GM") and ventricles ("VT") to processor 170 via operator interface 180. The scene being processed is displayed on image display device 190.

Operation of the system of FIG. 5 will now be described with reference to the flow chart of FIG. 6.

Figure 6:
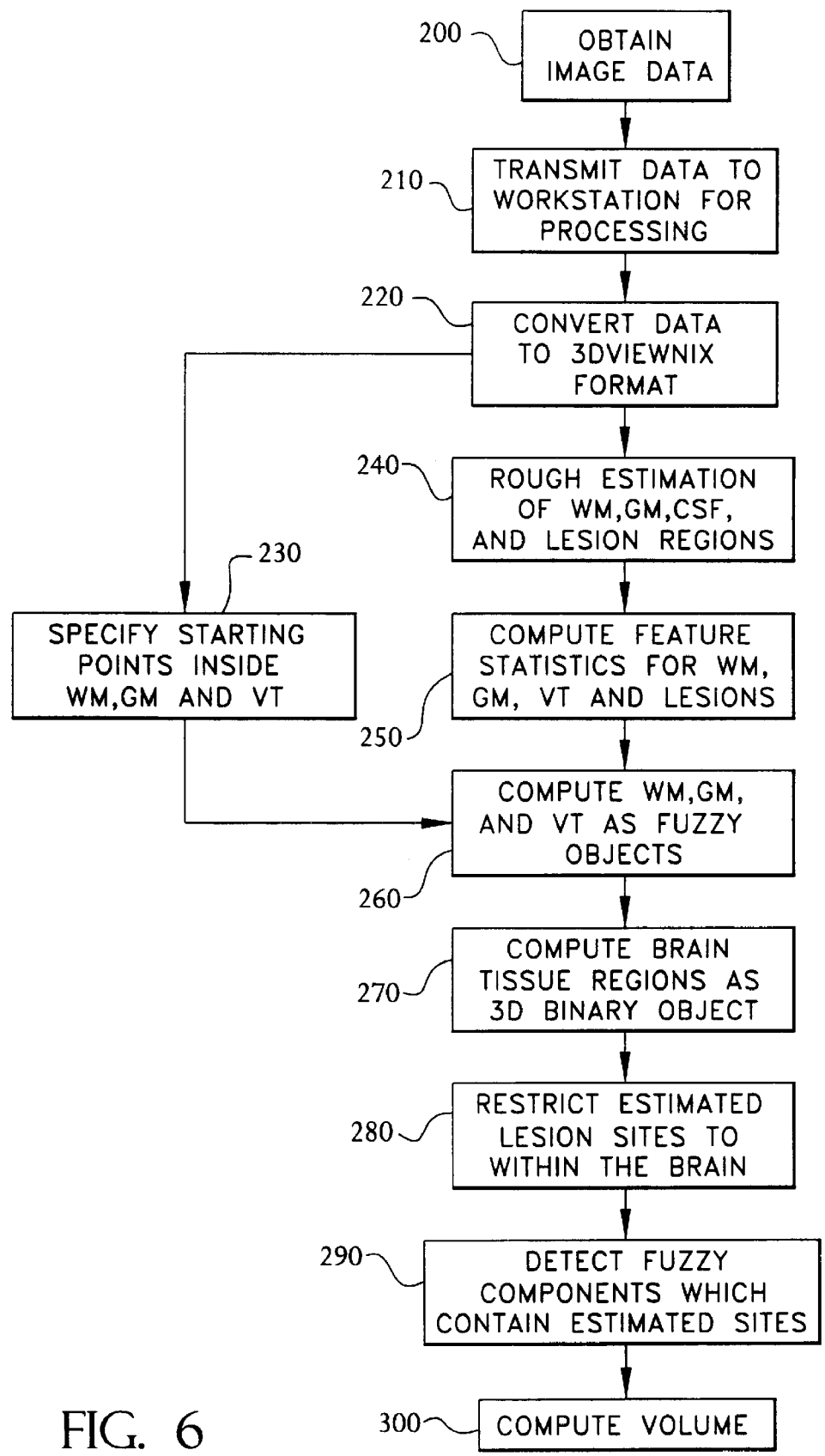
FIG. 6 illustrates a flow chart of a technique for the detection and quantification of MS lesions in accordance with the invention.

FIG. 6 illustrates a flow chart for the detection and quantification of MS lesions in accordance with the invention. As shown, image data representing T2 and PD values are obtained from MR scanner 100 at step 200 and transmitted at step 210 via PACS network 110 to workstation 120 including the image data processing system of the invention. At step 220, the transmitted image data are converted into 3DVIEWNIX format and stored in 3DVIEWNIX memory 150 for all subsequent processing.

On a display of a slice (of either the T2 or PD data) that passes through roughly the middle of the brain, the operator specifies, at step 230, a few starting points, typically 4 points for WM, 8 points for GM and 4 points for VT for the n-fuzzy object extraction and labelling in accordance with the invention. This is all the operator interaction that is required and takes about 30 seconds per patient data set. These starting points are specified on only one slice and are used as starting points in Algorithm κFOE for detecting and identifying the 3D fuzzy objects representing WM, GM, and VT in accordance with the techniques of the invention.

Figure 7:
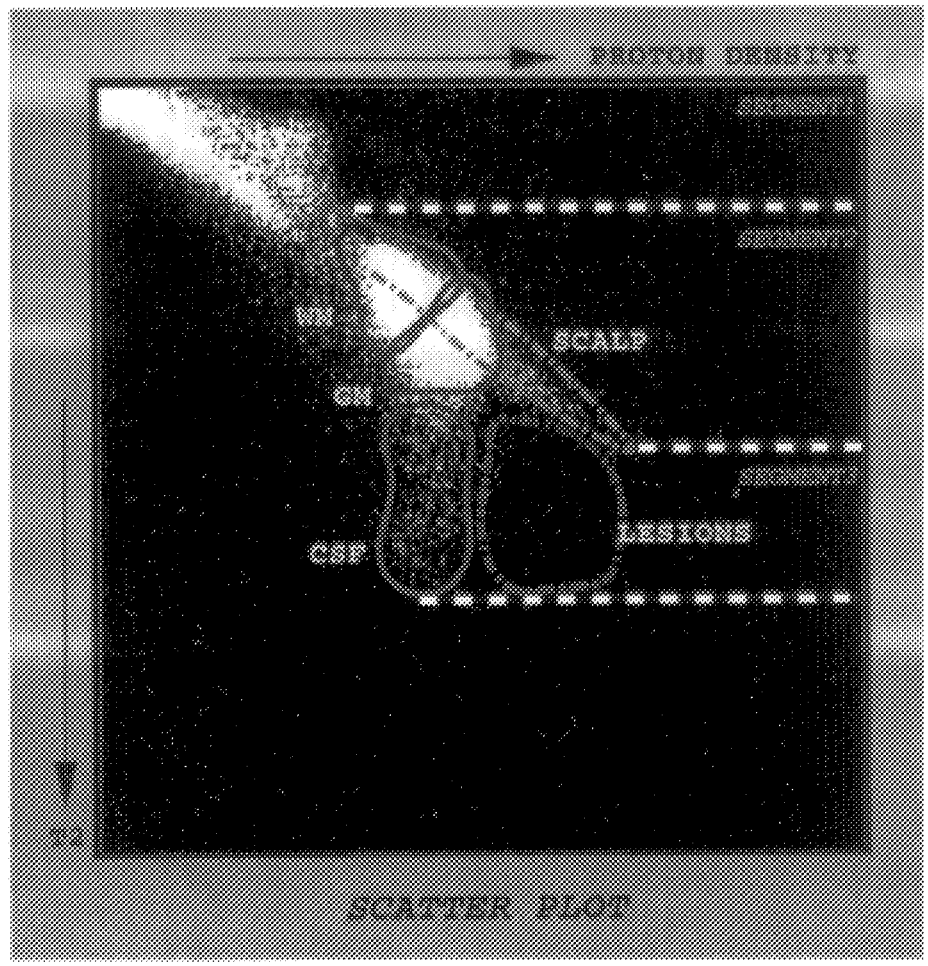
FIG. 7 illustrates a scatter plot for a typical T2, PD input scene, where WM is white matter, GM is gray matter, and CSF is cerebro-spinal fluid.

At step 240, the workstation 120 roughly determines the WM, GM, cerebrospinal fluid ("CSF"), VT and the lesion regions. This step is mainly for computing the mean and standard deviations of the feature values which are required for defining the fuzzy spel affinities in accordance with Equations 24 and 25 above. The basis for this computation is the 2D scatter plot of the T2 and PD values. FIG. 7 shows such a plot for a typical data set. The brightness value at a point (pixel) $(c_1,c_2)$ in this plot represents the number of spels in the given scene (note that the scene is vector-valued with two values—T2 and PD—assigned to each spel) that have values $c_1$ for T2 and $c_2$ for PD.

The scatter plot of FIG. 7 shows characteristic clusters that correspond to the different tissues types. The cluster corresponding to WM, for example, is such that the T2 and PD spel values of the WM regions essentially fall within this cluster. Unfortunately, the clusters are not unequivocal enough to identify the various tissues regions by finding out in which cluster the spel values fall. The WM cluster, for example, overlaps significantly the cluster corresponding to GM. The aim of step 240 is thus to identify the clusters somewhat conservatively to get a representative sample of the different tissue regions for estimating the T2 and PD statistics for the region. The approach of the invention differs greatly from other methods which attempt to partition the scatter plot as best as possible to determine the tissue regions. The reason why the latter methods do not have much success is that it is impossible to gather information about how spels "hang together" spatially to form a tissue region from a statistical analysis of the clusters. The scatter plot simply does not have such information.

In step 240, the clusters are identified approximately by taking the following steps. First, the scatter plot is divided into horizontal segments as shown in FIG. 7. The center of mass for Segment 2 is then computed. The principal axes for Segment 2 are then computed using principal component analysis. The center of mass together with the axes situated at this point characterize the shape of the cluster in Segment 2. Using this principal axis system, two clusters, one representing WM and the other representing GM, are automatically determined. In this determination, the fuzzy component tracking algorithm κFOE described above is used on the scatter plot and treats it as a 2D membership scene. In other words, the two clusters are obtained as $\kappa\theta_x$-objects of the cluster plot. This is a new idea in cluster analysis which exploits the "hanging togetherness" of points in the cluster plot to identify clusters automatically. The cluster corresponding to the CSF is obtained by finding the center of mass of Segment 3 and then computing a fuzzy component of the plot that contains this point. Finally, the cluster corresponding to the lesions is computed by determining the quadrilateral region bounded by the CSF cluster, GM cluster, and the scalp cluster.

For the tissue regions defined by the clusters found in step 240, the mean and standard deviation of T2 and PD components are determined at step 250. With these values, the functional forms of Equation 25 are completely determined for WM, GM, and VT.

Next, using the starting points specified by the operator at step 230 and the feature statistics for WM, GM, VT and lesions computed at step 250, WM, GM, and VT are computed as fuzzy objects at step 260. The functional forms used for $\mu_\kappa$ for the detection of WM, GM, VT and the lesions as fuzzy $\kappa\theta_x$-objects are as follows.

For $1 \leq i \leq 4$ and $a \in \{WM, GM, VT, LS\}$, where LS stands for "lesion," let $g_i^a(f(c), f(d))$ represent the functional forms in Equations 25a through 25d for the four tissue types. Then, for WM, the values selected in Equations 23a–23c are T=3, $h_1=g_1^{WM}$, $h_2=g_3^{GM}$, $h_3=g_3^{VT}$, $\omega_1=0.5$, and $\omega_2=\omega_3=0.25$. For GM, T=3, $h_1=g_1^{GM}$, $h_2=g_3^{WM}$, $h_3=g_3^{VT}$, $\omega_1=0.5$, and $\omega_2=\omega_3=0.25$. For VT T=3, $h_1=g_1^{VT}$, $h_2=g_3^{WM}$, $h_3=g_3^{GM}$, $\omega_1=0.5$, and $\omega_2=\omega_3=0.25$. For LS, T=1, $h_1=g_1^{LS}$, and $\omega_1=1$.

Normally, each of WM, GM and VT are expected to be a connected entity in three dimensions. In principle, one point (spel) specified for each of these objects is adequate to detect them as fuzzy connected objects. The purpose of selecting multiple points in step 230 is to ensure that all aspects of each of the objects are captured in the extracted fuzzy components. With the following modifications to Steps 0 and 1 of Algorithm κFOE, the multiple points can be handled simultaneously without having to detect each of WM, GM, and VT for each of their starting points. While detecting a particular object, say WM, all its starting points are considered as follows:

0. Set all elements of $C_o$ to 0 except the starting spels (points) specified for the object, which are set to 1;
1. For each starting spel 0 specified for the object, push all spels c of $C_o$ such that $\mu_\kappa(o,c)>0$ to Q.

Next, at step 270, the solid brain tissue regions are computed as a 3D binary object. The holes in this object correspond essentially to lesion sites. These lesion sites are then used in step 290 to compute lesions as fuzzy objects. The brain as a 3D binary object is computed by taking a union of the 3D binary scenes resulting from thresholding the $K_o$-scenes corresponding to WM and GM at a fairly liberal threshold. The resulting 3D binary object represents the WM and GM regions of the brain.

The holes in the 3D binary object found in step 270 correspond to lesion sites. At step 280, these sites are computed as a set of points (spels). The spels determined at step 280 then are used at step 290 as starting spels in Algorithm κFOE to determine the lesions as fuzzy objects. Often, all starting spels are used simultaneously, as described in step 260 for detecting the lesions simultaneously. When the number of lesions and their sites are also of importance, Algorithm κFOL is used to output each lesion as a separate fuzzy $\kappa\theta_x$-object.

Finally, at step 300, the volume of a fuzzy $\kappa\theta_x$-object is computed and output as a single number for a chosen value of x. To compute this volume, the spel volumes are added after being weighted by the membership of each spel in the $\kappa\theta_x$-object. More appropriately, volume is output as a function V(x) of the strength of the object. For each value of x between $x_{min}$ and $x_{max}$, the volume V(x) of the fuzzy $\kappa\theta_x$-object is computed. $x_{min}$ and $x_{max}$ are chosen such that outside the interval $[x_{min}, x_{max}]$ the $\kappa\theta_x$-object defined for any x is clearly unacceptable.

In accordance with the invention, a new theory for fuzzy object definition in n-dimensional (fuzzy) digital spaces is used to define a fuzzy object as a fuzzy connected component of spatial elements (spels). Fuzzy connectedness is a fuzzy relation in the set of all spels which combines together the notion of fuzzy adjacency of spels, which is independent of any image information, and fuzzy affinity between spels, which depends on image intensity values. Although the definition of a fuzzy object involves combinatorics of impractical proportion even for 2D digital spaces, with the help of some basic results relating to fuzzy connectedness and fuzzy objects, practical algorithms for the extraction of fuzzy objects in given multidimensional image data has been described herein. The power of these algorithms in accurate object definition in digital imagery becomes evident when such techniques are applied in medical imaging, particularly for the detection and quantification of MS lesions of the brain via MR imaging.

It will be appreciated by those skilled in the art that the foregoing has set forth the presently preferred embodiments of the invention and illustrative embodiments of the invention but that numerous alternative embodiments are possible without departing from the novel teachings of the invention. For example, those skilled in the art will appreciate that the techniques of the invention may be used for diagnosing many other types of tissue malignancies. Accordingly, all such modifications are intended to be included within the scope of the appended claims.

We claim:

1. An imaging system for identifying fuzzy or blurred objects within a multidimensional scene, comprising:

means for creating a digital representation of said scene, said digital representation comprising a plurality of spatial elements;

a memory for storing said digital representation of said scene;

means for determining a strength of connectedness of each spatial element in said digital representation of said scene with other spatial elements in said digital representation of said scene, where the strength of connectedness along a path between a first spatial element and a second spatial element is defined as the smallest affinity between respective spatial elements along said path;

means for clustering those spatial elements in said memory having strengths of connectedness with other spatial elements in said memory above a predetermined threshold into a fuzzy connected component of a fuzzy object in said scene; and means for displaying said fuzzy connected component so that said fuzzy connected component is distinguished from other fuzzy connected components in said scene.

2. An imaging system as in claim 1, further comprising means for determining a volume distribution of said fuzzy connected component for said predetermined threshold.

3. An imaging system as in claim 1, wherein said means for determining the strength of connectedness of spatial elements in said digital representation of said scene determines the strength of connectedness between said first spatial element and said second spatial element as the largest of the strengths of connectedness of respective paths from said first spatial element to said second spatial element.

4. An imaging system as in claim 1, wherein said means for creating a digital representation of said scene creates said scene as a set of image slices.

5. A method for identifying fuzzy or blurred objects within a multidimensional scene, comprising the steps of:
scanning said scene to create a digital representation of said scene, said digital representation comprising a plurality of spatial elements;

storing said digital representation of said scene;

determining a strength of connectedness of each spatial element in said digital representation of said scene with other spatial elements in said digital representation of said scene, where the strength of connectedness along a path between a first spatial element and a second spatial element is defined as the smallest affinity between respective spatial elements along said path;

creating a $K_o$ scene comprising spatial elements having strengths of connectedness with other spatial elements above a predetermined threshold; and displaying said $K_o$ scene.

6. A method as in claim 5, comprising the further step of determining a volume distribution of a fuzzy connected object comprising spatial elements with strengths of connectedness with other spatial elements above said predetermined threshold.

7. A method as in claim 5, wherein said strength of connectedness determining step comprises the step of determining the strength of connectedness between said first spatial element and said second spatial element as the largest of the strengths of connectedness of respective paths from said first spatial element to said second spatial element.

8. A method as in claim 5, wherein said scanning step comprises the step of creating a set of image slices.

9. A system for detecting multiple sclerosis (MS) lesions in a magnetic resonance (MR) image of a patient's brain, comprising:
an MR scanner for creating a digital representation of an image slice through the patient's brain, said digital representation comprising a plurality of spatial elements;

a memory for storing said digital representation of said image slice;

processing means for determining a strength of connectedness of each spatial element in said digital representation of said image slice with other spatial elements in said digital representation of said image slice where the strength of connectedness along a path between a first spatial element and a second spatial element is defined as the smallest affinity between respective spatial elements along said path, and for clustering those spatial elements having strengths of connectedness with other spatial elements above a predetermined threshold into a fuzzy connected component of the portion of the patient's brain in said image slice; and means for permitting identification of said fuzzy connected component as an MS lesion by displaying said fuzzy connected component so that it is distinguished from other fuzzy connected components in said image slice of the patient's brain.

10. A system as in claim 9, further comprising means for determining a volume distribution of said fuzzy connected component for said predetermined threshold, thereby determining a volume distribution of said MS lesion.

11. A system as in claim 9, wherein said processing means determines the strength of connectedness between said first spatial element and said second spatial element as the largest of the strengths of connectedness of respective paths from said first spatial element to said second spatial element and clusters those spatial elements having strengths of connectedness with other spatial elements above said predetermined threshold into said fuzzy connected component of the portion of the patient's brain in said image slice.

12. A system as in claim 9, wherein said MR scanner creates said scene as a set of image slices and said processing means determines a strength of connectedness of each spatial element in a digital representation of one image slice with other spatial elements in a digital representation of another image slice.

13. A method of detecting multiple sclerosis (MS) lesions in a magnetic resonance (MR) image of a patient's brain, comprising the steps of:
creating a digital representation of an MR image slice through the patient's brain, said digital representation comprising a plurality of spatial elements;

storing said digital representation of said MR image slice;

specifying spatial elements in at least one of the gray matter, white matter, and ventricles of the MR image slice through the patient's brain as starting points for a strength of connectedness determination for said spatial elements;

determining a strength of connectedness of each spatial element in said digital representation of said MR image slice, starting with said starting points, with other spatial elements in said digital representation of said MR image slice, where the strength of connectedness along a path between a first spatial element and a second spatial element is defined as the smallest affinity between respective spatial elements along said path;

clustering spatial elements having strengths of connectedness with other spatial elements above predetermined thresholds into fuzzy connected white matter, gray matter, ventricle, and lesion components of the portion of the patient's brain in said image slice; and identifying said fuzzy connected lesion component as an MS lesion by displaying said fuzzy connected lesion component so that it is distinguished from said fuzzy connected white matter, gray matter, and ventricle components in said image slice of the patient's brain.

14. A method as in claim 13, wherein said clustering step comprises the steps of dividing said digital representation of said MR image slice into segments, computing the center of mass and principal axes of one of said segments, and determining from said principal axes and said center of mass a cluster representing white matter and a cluster representing gray matter of the patient's brain.

15. A method as in claim 14, wherein said clustering step comprises the further step of determining a cluster representing cerebrospinal fluid of the patient's brain by computing the center of mass of another one of said segments predicted to include said cerebrospinal fluid and determining which fuzzy connected component contains said center of mass of said another segment.

16. A method as in claim 13, comprising the further step of determining a volume distribution of said fuzzy connected lesion component for a predetermined threshold, thereby determining a volume distribution of said MS lesion.

17. A method as in claim 13, wherein said strength of connectedness determining step comprises the steps of determining the strength of connectedness between said first spatial element and said second spatial element as the largest of the strengths of connectedness of respective paths from said first spatial element to said second spatial element and clustering those spatial elements having strengths of connectedness with other spatial elements above said predetermined threshold into said fuzzy connected lesion component of the portion of the patient's brain in said image slice.

18. A method as in claim 13, wherein said digital representation creating step comprises the step of creating said scene as a set of image slices and said strength of connectedness determining step comprises the step of determining a strength of connectedness of each spatial element in a digital representation of one image slice with other spatial elements in a digital representation of another image slice.

* * * * *